(12) United States Patent
Bridges

(10) Patent No.: US 8,902,408 B2
(45) Date of Patent: Dec. 2, 2014

(54) LASER TRACKER USED WITH SIX DEGREE-OF-FREEDOM PROBE HAVING SEPARABLE SPHERICAL RETROREFLECTOR

(75) Inventor: Robert E. Bridges, Kennett Square, PA (US)

(73) Assignee: Faro Technologies Inc., Lake Mary, FL (US)

( * ) Notice: Subject to any disclaimer, the term of this patent is extended or adjusted under 35 U.S.C. 154(b) by 236 days.

(21) Appl. No.: 13/453,002

(22) Filed: Apr. 23, 2012

(65) Prior Publication Data

US 2013/0155386 A1 Jun. 20, 2013

Related U.S. Application Data

(63) Continuation-in-part of application No. 13/407,983, filed on Feb. 29, 2012, now Pat. No. 8,467,072, and a continuation-in-part of application No. 13/370,339, filed on Feb. 10, 2012.

(60) Provisional application No. 61/592,049, filed on Jan. 30, 2012, provisional application No. 61/448,823, filed on Mar. 3, 2011, provisional application No. 61/442,452, filed on Feb. 14, 2011, provisional application No. 61/475,703, filed on Apr. 15, 2011, provisional application No. 61/592,049, filed on Jan. 30, 2012.

(51) Int. Cl.
*G01C 3/08* (2006.01)
(52) U.S. Cl.
USPC ............ 356/4.01; 356/3.01; 356/5.01; 356/9; 356/625; 342/5; 342/61; 342/73; 342/118; 342/140; 342/147; 342/156; 367/13; 367/21; 367/27; 367/28; 367/64; 367/118

(58) Field of Classification Search
USPC ......... 356/3.01, 4.01, 5.01, 9, 625; 342/5, 61, 342/73, 118, 140, 147, 156; 367/13, 21, 27, 367/28, 64, 118
See application file for complete search history.

(56) References Cited

U.S. PATENT DOCUMENTS 2,682,804 A 7/1954 Clifford et al.
2,784,641 A 3/1957 Keuffel et al.
(Continued)

FOREIGN PATENT DOCUMENTS

CN 1531659 A 9/2004
CN 101031817 A 9/2007
(Continued)

OTHER PUBLICATIONS

Optical Circulator (3-Ports & 4-Ports); [on-line technical data sheet]; Alliance Fiber Optic Products, Inc. Rev.D Jan. 15, 2004; Retrieved from www.afop.com.

(Continued)

*Primary Examiner* — Luke Ratcliffe
*Assistant Examiner* — Samantha K Abraham
(74) *Attorney, Agent, or Firm* — Cantor Colburn LLP

(57) ABSTRACT

A method for measuring three-dimensional coordinates of a probe center includes: providing a spherically mounted retroreflector; providing a probe assembly; providing an orientation sensor; providing a coordinate measurement device; placing the spherically mounted retroreflector on the probe head; directing the first beam of light from the coordinate measurement device to the spherically mounted retroreflector; measuring the first distance; measuring the first angle of rotation; measuring the second angle of rotation; measuring the three orientational degrees of freedom based at least in part on information provided by the orientation sensor; calculating the three-dimensional coordinates of the probe center based at least in part on the first distance, the first angle of rotation, the second angle of rotation, and the three orientational degrees of freedom; and storing the three-dimensional coordinates of the probe center.

13 Claims, 25 Drawing Sheets

(56) References Cited

U.S. PATENT DOCUMENTS

| | | | |
|---|---|---|---|
| 3,339,457 A | 9/1967 | Pun | |
| 3,365,717 A | 1/1968 | Holscher | |
| 3,464,770 A | 9/1969 | Schmidt | |
| 3,497,695 A | 2/1970 | Smith et al. | |
| 3,508,828 A | 4/1970 | Froome et al. | |
| 3,619,058 A | 11/1971 | Hewlett et al. | |
| 3,627,429 A | 12/1971 | Jaenicke et al. | |
| 3,658,426 A | 4/1972 | Vyce | |
| 3,728,025 A | 4/1973 | Madigan et al. | |
| 3,740,141 A | 6/1973 | DeWitt, Jr. | |
| 3,779,645 A | 12/1973 | Nakazawa et al. | |
| 3,813,165 A | 5/1974 | Hines et al. | |
| 3,832,056 A | 8/1974 | Shipp et al. | |
| 3,900,260 A | 8/1975 | Wendt | |
| 3,914,052 A | 10/1975 | Wiklund | |
| 4,113,381 A | 9/1978 | Epstein | |
| 4,297,030 A | 10/1981 | Chaborski | |
| 4,403,857 A | 9/1983 | Holscher | |
| 4,453,825 A | 6/1984 | Buck et al. | |
| 4,498,764 A | 2/1985 | Bolkow et al. | |
| 4,531,833 A | 7/1985 | Ohtomo | |
| 4,632,547 A | 12/1986 | Kaplan et al. | |
| 4,652,130 A * | 3/1987 | Tank | 356/455 |
| 4,689,489 A | 8/1987 | Cole | |
| 4,692,023 A | 9/1987 | Ohtomo et al. | |
| 4,699,508 A | 10/1987 | Bolkow et al. | |
| 4,707,129 A | 11/1987 | Hashimoto et al. | |
| 4,714,339 A | 12/1987 | Lau et al. | |
| 4,790,651 A | 12/1988 | Brown et al. | |
| 5,002,388 A | 3/1991 | Ohishi et al. | |
| 5,051,934 A | 9/1991 | Wiklund | |
| 5,082,364 A | 1/1992 | Russell | |
| 5,090,131 A * | 2/1992 | Deer | 33/556 |
| 5,162,862 A | 11/1992 | Bartram et al. | |
| 5,319,434 A | 6/1994 | Croteau et al. | |
| 5,400,130 A | 3/1995 | Tsujimoto et al. | |
| 5,402,193 A | 3/1995 | Choate | |
| 5,416,321 A | 5/1995 | Sebastian et al. | |
| 5,440,112 A | 8/1995 | Sakimura et al. | |
| 5,455,670 A | 10/1995 | Payne et al. | |
| 5,534,992 A | 7/1996 | Takeshima et al. | |
| 5,737,068 A | 4/1998 | Kaneko et al. | |
| 5,742,379 A | 4/1998 | Reifer | |
| 5,754,284 A | 5/1998 | Leblanc et al. | |
| 5,764,360 A | 6/1998 | Meier | |
| 5,771,623 A | 6/1998 | Pernstich et al. | |
| 5,861,956 A * | 1/1999 | Bridges et al. | 356/614 |
| 5,880,822 A | 3/1999 | Kubo | |
| 5,886,777 A | 3/1999 | Hirunuma | |
| 5,892,575 A | 4/1999 | Marino | |
| 5,991,011 A | 11/1999 | Damm | |
| 6,017,125 A | 1/2000 | Vann | |
| D427,087 S | 6/2000 | Kaneko et al. | |
| 6,100,540 A | 8/2000 | Ducharme et al. | |
| 6,324,024 B1 | 11/2001 | Shirai et al. | |
| 6,330,379 B1 | 12/2001 | Hendriksen | |
| 6,351,483 B1 | 2/2002 | Chen | |
| 6,369,880 B1 | 4/2002 | Steinlechner | |
| 6,437,859 B1 | 8/2002 | Ohtomo et al. | |
| 6,463,393 B1 | 10/2002 | Giger | |
| 6,490,027 B1 | 12/2002 | Rajchel et al. | |
| 6,532,060 B1 | 3/2003 | Kindaichi et al. | |
| 6,563,569 B2 | 5/2003 | Osawa et al. | |
| 6,583,862 B1 | 6/2003 | Perger | |
| 6,633,367 B2 | 10/2003 | Gogolla | |
| 6,727,984 B2 | 4/2004 | Becht | |
| 6,727,985 B2 | 4/2004 | Giger | |
| 6,765,653 B2 | 7/2004 | Shirai et al. | |
| 6,847,436 B2 | 1/2005 | Bridges | |
| 6,859,744 B2 | 2/2005 | Giger | |
| 6,864,966 B2 | 3/2005 | Giger | |
| 7,023,531 B2 | 4/2006 | Gogolla et al. | |
| 7,095,490 B2 | 8/2006 | Ohtomo et al. | |
| 7,099,000 B2 | 8/2006 | Connolly | |
| 7,177,014 B2 | 2/2007 | Mori et al. | |
| 7,196,776 B2 | 3/2007 | Ohtomo et al. | |
| 7,224,444 B2 | 5/2007 | Stierle et al. | |
| 7,248,374 B2 | 7/2007 | Bridges | |
| 7,256,899 B1 | 8/2007 | Faul et al. | |
| 7,262,863 B2 | 8/2007 | Schmidt et al. | |
| 7,327,446 B2 | 2/2008 | Cramer et al. | |
| 7,336,346 B2 | 2/2008 | Aoki et al. | |
| 7,339,655 B2 | 3/2008 | Nakamura et al. | |
| 7,352,446 B2 | 4/2008 | Bridges et al. | |
| 7,372,558 B2 | 5/2008 | Kaufman et al. | |
| 7,453,554 B2 | 11/2008 | Yang et al. | |
| 7,466,401 B2 | 12/2008 | Cramer et al. | |
| 7,471,377 B2 | 12/2008 | Liu et al. | |
| 7,474,388 B2 | 1/2009 | Ohtomo et al. | |
| 7,480,037 B2 | 1/2009 | Palmateer et al. | |
| 7,492,444 B2 | 2/2009 | Osada | |
| 7,511,824 B2 | 3/2009 | Sebastian et al. | |
| 7,518,709 B2 | 4/2009 | Oishi et al. | |
| 7,535,555 B2 | 5/2009 | Nishizawa et al. | |
| 7,586,586 B2 | 9/2009 | Constantikes | |
| D605,959 S | 12/2009 | Apotheloz | |
| 7,701,559 B2 | 4/2010 | Bridges et al. | |
| 7,738,083 B2 | 6/2010 | Luo et al. | |
| 7,751,654 B2 | 7/2010 | Lipson et al. | |
| 7,800,758 B1 | 9/2010 | Bridges et al. | |
| 7,804,602 B2 | 9/2010 | Raab | |
| 7,812,736 B2 * | 10/2010 | Collingwood et al. | 340/686.1 |
| D629,314 S | 12/2010 | Ogasawara | |
| 7,929,150 B1 | 4/2011 | Schweiger | |
| 7,990,523 B2 | 8/2011 | Schlierbach et al. | |
| 8,087,315 B2 | 1/2012 | Goossen et al. | |
| 8,314,939 B2 | 11/2012 | Kato | |
| 2002/0093646 A1 | 7/2002 | Muraoka et al. | |
| 2003/0133092 A1 | 7/2003 | Rogers | |
| 2004/0075823 A1 | 4/2004 | Lewis et al. | |
| 2005/0147477 A1 | 7/2005 | Clark | |
| 2006/0066836 A1 | 3/2006 | Bridges et al. | |
| 2006/0103853 A1 | 5/2006 | Palmateer | |
| 2006/0132803 A1 | 6/2006 | Clair et al. | |
| 2006/0145703 A1 | 7/2006 | Steinbichler et al. | |
| 2006/0222237 A1 | 10/2006 | Du et al. | |
| 2007/0016386 A1 | 1/2007 | Husted | |
| 2007/0024842 A1 | 2/2007 | Nishizawa et al. | |
| 2007/0121095 A1 | 5/2007 | Lewis | |
| 2007/0127013 A1 | 6/2007 | Hertzman et al. | |
| 2007/0130785 A1 | 6/2007 | Bublitz et al. | |
| 2007/0247615 A1 | 10/2007 | Bridges | |
| 2008/0203299 A1 * | 8/2008 | Kozuma et al. | 250/310 |
| 2008/0239281 A1 | 10/2008 | Bridges | |
| 2008/0316497 A1 | 12/2008 | Taketomi et al. | |
| 2008/0316503 A1 | 12/2008 | Smarsh et al. | |
| 2009/0009747 A1 | 1/2009 | Wolf et al. | |
| 2009/0046271 A1 | 2/2009 | Constantikes | |
| 2009/0066932 A1 | 3/2009 | Bridges et al. | |
| 2009/0190125 A1 * | 7/2009 | Foster et al. | 356/243.4 |
| 2010/0058252 A1 | 3/2010 | Ko | |
| 2010/0128259 A1 | 5/2010 | Bridges et al. | |
| 2010/0176270 A1 | 7/2010 | Lau et al. | |
| 2010/0207938 A1 | 8/2010 | Yau et al. | |
| 2010/0245851 A1 | 9/2010 | Teodorescu | |
| 2010/0250175 A1 | 9/2010 | Briggs et al. | |
| 2010/0277747 A1 | 11/2010 | Rueb et al. | |
| 2011/0032509 A1 | 2/2011 | Bridges | |
| 2011/0069322 A1 | 3/2011 | Hoffer, Jr. | |
| 2011/0109502 A1 | 5/2011 | Sullivan | |
| 2011/0173827 A1 | 7/2011 | Bailey et al. | |
| 2011/0175745 A1 * | 7/2011 | Atwell et al. | 340/665 |
| 2012/0262728 A1 | 10/2012 | Bridges et al. | |
| 2013/0096873 A1 | 4/2013 | Rosengaus et al. | |

FOREIGN PATENT DOCUMENTS

| | | |
|---|---|---|
| DE | 3827458 A1 | 2/1990 |
| DE | 202006020299 U1 | 5/2008 |
| EP | 0166106 | 1/1986 |
| EP | 598523 A1 | 5/1994 |
| EP | 1067363 A2 | 1/2001 |
| EP | 1607767 A1 | 12/2005 |
| EP | 2177868 A2 | 10/2009 |

(56) References Cited

FOREIGN PATENT DOCUMENTS

| EP | 2259010 A1 | 12/2010 |
|---|---|---|
| EP | 2259013 A1 | 12/2010 |
| JP | 57147800 | 9/1982 |
| JP | 5804881 | 3/1983 |
| JP | 2184788 | 7/1990 |
| JP | 5302976 | 11/1993 |
| JP | 6097288 | 4/1994 |
| JP | 11337642 | 12/1999 |
| JP | 2000275042 A | 10/2000 |
| JP | 2000346645 A | 12/2000 |
| JP | 2001272468 | 10/2001 |
| JP | 2002098762 | 4/2002 |
| JP | 2002209361 A | 7/2002 |
| JP | 2004527751 | 9/2004 |
| JP | 2008514967 | 5/2008 |
| WO | 0177613 A1 | 10/2001 |
| WO | 02084327 | 10/2002 |
| WO | 03062744 A1 | 7/2003 |
| WO | 2004063668 | 7/2004 |
| WO | 2006039682 A1 | 4/2006 |
| WO | 2007084209 A2 | 7/2007 |
| WO | 2008052348 A1 | 5/2008 |
| WO | 2008119073 A2 | 10/2008 |
| WO | 2010141120 A2 | 12/2010 |
| WO | 2010148525 A1 | 12/2010 |

OTHER PUBLICATIONS

Super-Nyquist Operation of the AD9912 Yields a High RF Output Signal; Analog Devices, Inc., AN-939 Application Note; www.analog.com; Copyright 2007.
Nanona High Speed & Low Loss Optical Switch; [on-line technical data sheet]; [Retrieved Oct. 14, 2010]; Retrieved from http://www.bostonati.com/products/PI-FOS.pdf.
Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptical.ws.html.
EOSpace—High-Speed Switches; [on-line technical brochure]; [Retrieved May 18, 2009]; Retrieved from http://www.cospace.com/Switches.htm.
FARO Laser Tracker ION; 2 pages; revised Apr. 23, 2010; FARO Technologies, Inc., www.lasertracker.faro.com.
Great Britain Search Report for Application No. GB1013200.9 dated Nov. 22, 2010.
AO Modulator—M040-8J-FxS; [online—technical data sheet]; Gooch & Housego; Nov. 2006; Retrieved from http://www.goochandhousego.com/.
2×2 High Speed Lithium Niobate Interferometric Switch; [on-line]; JDS Uniphase Corporation; 2007; Retrieved from www.jdsu.com.
Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudennodulators_en.pdf?Open.
Kester, Walt, Practical Analog Design Techniques, Analog Devices, Section 5, Undersampling Applications, Copyright 1995, pp. 5-1 to 5-34.
Optical Circulators Improve Bidirectional Fiber Systems; By Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirectional-fiber-systems.
Leica Absolute Tracker AT401-ASME B89.4.19/2006 Specifications; Hexagon Metrology; Leica Geosystems Metrology Products, Switzerland; 2 pages; www.leica-geosystems.com/metrology.
Lightvision—High Speed Variable Optical Attenuators (VOA); [on-line]; A publication of Lightwaves 2020, Feb. 1, 2008; Retrieved from http://www.lightwaves2020.com/home/.

LaserTRACER-measuring sub-micron in space; http://www.etalon-ag.com/index.php/en/products/lasertracer; 4 pages; Jun. 28, 2011; ETALON AG.
Computer Giants Embrace On-Chip Optics; Mar. 27, 2008; [on-line]; Optics.org; [Retrieved on Apr. 2, 2008]; Retrieved from http://optics.org/cws/article/research/33521.
MEMS Variable Optical Attenuators Single/Multi-Channel; [on-line]; Jan. 17, 2005; Retrieved from www.ozoptics.com.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., Digital Laser Range Finder: Phase-Shift Estimation by Undersampling Technique; IEEE, Copyright 1999.
RS Series Remote Controlled Optical Switch; [on-line technical data sheet]; Sercalo Microtechnology, Ltd. [Retrieved Oct. 14, 2010]; Retrieved from http://www.sercalo.com/document/PDFs/DataSheets/RS%20datasheet.pdf.
Tracker3; Ultra-Portable Laser Tracking System; 4 pages; 2010 Automated Precision Inc.; www.apisensor.com.
International Search Report of the International Searching Authority for Application No. PCT/2012/030225; Date of Mailing Sep. 28, 2012.
International Search Report of the International Searching Authority for Application No. PCT/US2012/032971; Date of Mailing Sep. 3, 2012.
International Search Report of the International Searching Authority for Application No. PCT/US2012/0033435; Date of Mailing Sep. 17, 2012.
International Search Report of the International Seracrhing Aurhority for Application No. PCT/YS2012/033720; Date of Mailing Sep. 26, 2012.
Written Opinion of the International Searching Authority for Application No. PCT/US2012/030225; Date of Mailing Sep. 28, 2012.
Written Opinion of the International Searching Authority for Application No. PCT/US2012/032971; Date of Mailing Sep. 3, 2012.
Written Opinion of the International Searching Authority for Application No. PCT/US2012/033435; Date of Mailing Sep. 17, 2012.
Written Opinion of the International Searching Authority for Application No. PCT/US2012/033720; Date of Mailing Sep. 26, 2012.
Chinese Office Action issued Sep. 22, 2013 for Patent Application No. 201010251189.3.
International Preliminary Report on Patentability for International Application Serial No. PCT/US2012/030225. International filing date Mar. 23, 2012. Date of Issuance Oct. 15, 2013.
International Preliminary Report on Patentability for International Application Serial No. PCT/US2012/030835. International filing date Mar. 28, 2012. Date of Issuance Oct. 15, 2013.
International Preliminary Report on Patentability for International Application Serial No. PCT/US2012/032715. International filing date Apr. 9, 2012. Date of Issuance Oct. 15, 2013.
International Preliminary Report on Patentability for International Application Serial No. PCT/US2012/032970. International filing date Apr. 11, 2012. Date of Issuance Oct. 15, 2013.
International Preliminary Report on Patentability for International Application Serial No. PCT/US2012/032971. International filing date Apr. 11, 2012. Date of Issuance Oct. 15, 2013.
International Preliminary Report on Patentability for International Application Serial No. PCT/US2012/032972. International filing date Apr. 11, 2012. Date of Issuance Oct. 15, 2013.
International Preliminary Report on Patentability for International Application Serial No. PCT/US2012/032990. International filing date Apr. 11, 2012. Date of Issuance Oct. 15, 2013.
International Preliminary Report on Patentability for International Application Serial No. PCT/US2012/033435. International filing date Apr. 13, 2012. Date of Issuance Oct. 15, 2013.
International Preliminary Report on Patentability for International Application Serial No. PCT/US2012/033477. International filing date Apr. 13, 2012. Date of Issuance Oct. 15, 2013.
International Preliminary Report on Patentability for International Application Serial No. PCT/US2012/033720. International filing date Apr. 16, 2012. Date of Issuance Oct. 15, 2013.

(56) References Cited

OTHER PUBLICATIONS

International Preliminary Report on Patentability for International Application Serial PCT/US2012/031368. International filing date Mar. 30, 2012. Date of Issuance Oct. 15, 2013.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8, 2006.
Chinese Search Report for Chinese Application No. 201010251189; Dated Sep. 10, 2013.
International Search Report of the International Searching Authority for Application No. PCT/US2012/032970; Date of Mailing Nov. 28, 2012.
International Search Report of the International Searching Authority for Application No. PCT/US2012/032972; Date of Mailing Nov. 28, 2012.
International Search Report of the International Searching Authority for Application No. PCT/US2012/032990; Date of Mailing Dec. 4, 2012.
Written Opinion of the International Searching Authority for Application No. PCT/US2012/032970; Date of Mailing Nov. 28, 2012.
Written Opinion of the International Searching Authority for Application No. PCT/US2012/032972; Date of Mailing Nov. 28, 2012.
Written Opinion of the International Searching Authority for Application No. PCT/US2012/032990; Date of Mailing Dec. 4, 2012.
International Search Report of the International Searching Authority for Application No. PCT/US2012/034611; Date of Mailing Dec. 13, 2012.
Written Opinion of the International Searching Authority for Application No. PCT/US2012/034611; Date of Mailing Dec. 13, 2012.
Office Action for Japanese Patent Application No. 2010-176909 filed Aug. 6, 2010; issued on Mar. 19, 2013. All art cited within.
Chen, Junewen, "Novel Laser Range Finding Algorithms", Proceedings of SPIE, vol. 6100, Jan. 1, 2006, pp. 61001Q-610010-Q, XP55031002, ISSN: 0277-786X, DOI: 10.1117/12.645131, the whole document.
International Search Report of the International Searching Authority for Application No. PCT/US2012/030835; Date of Mailing Jul. 23, 2012.
International Search Report of the International Searching Authority for Application No. PCT/US2012/031368; Date of Mailing Jul. 18, 2012.
International Search Report of the International Searching Authority for PCT/US2012/032715; Date of Mailing Jul. 5, 2012.
International Search Report of the International Searching Authority for Application No. PCT/US2012/033477; Date of Mailing Jul. 20, 2012.
Leica Laser Tracker System, Leica Geosystems AG, Jan. 1, 1999, XP002678836, Retrieved from the Internet: URL:http://www.a-solution.com.au/pages/downloads/LTD500_Brochure_EN.pdf [retrieved on 2012] the whole document.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517, the whole document.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2002, pp. S356-S363, XP020080997, ISSN: 1464-4258, DOI: 10/088/1464-4258/4/6/380, the whole document.
Written Opinion of the International Searching Authority for Application No. PCT/US2012/030835; Date of Mailing Jul. 23, 2012.
Written Opinion of the International Searching Authority for Application No. PCT/US2012/031368; Date of Mailing Jul. 18, 2012.
Written Opinion of the International Searching Authority for PCT/US2012/032715; Date of Mailing Jul. 5, 2012.
Written Opinion of the International Searching Authority for Application No. PCT/US2012/033477; Date of Mailing Jul. 20, 2012.
Japanese Patent Application No. 2010-176909 filed Aug. 6, 2010; issued on Oct. 23, 2012. All art cited within.
German Office Action for Application No. 102010038955.2; Issued Apr. 23, 2014.
Office Action for Japanese Patent Application No. 2014-505151 filed Oct. 11, 2013; issued on Apr. 30, 2014.

* cited by examiner

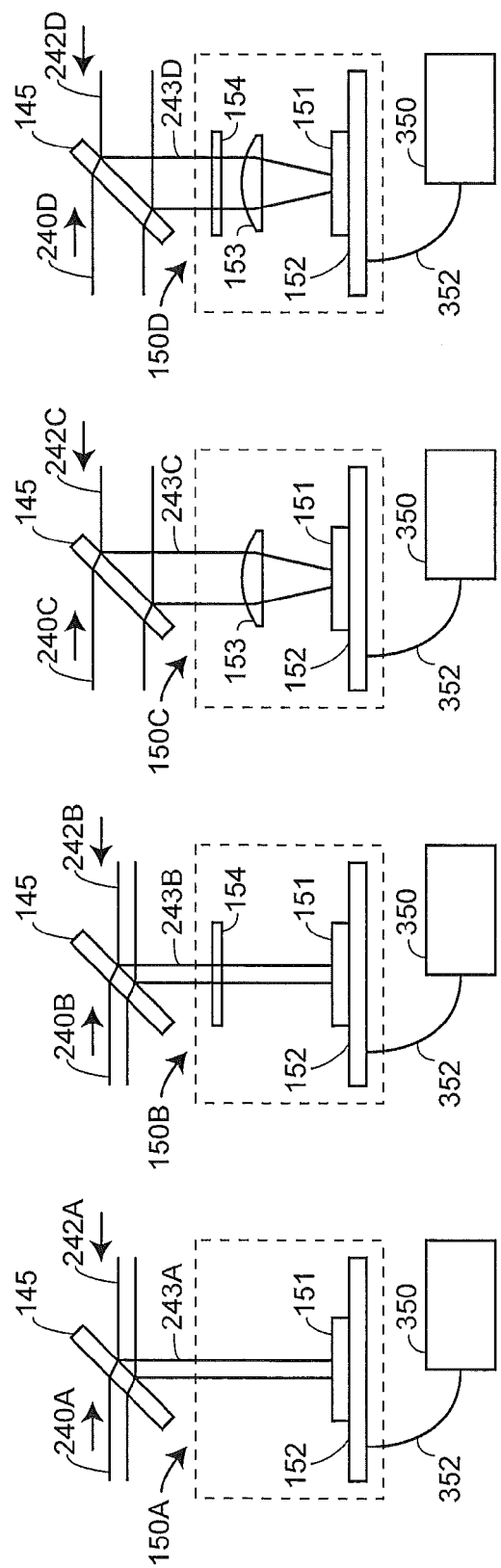

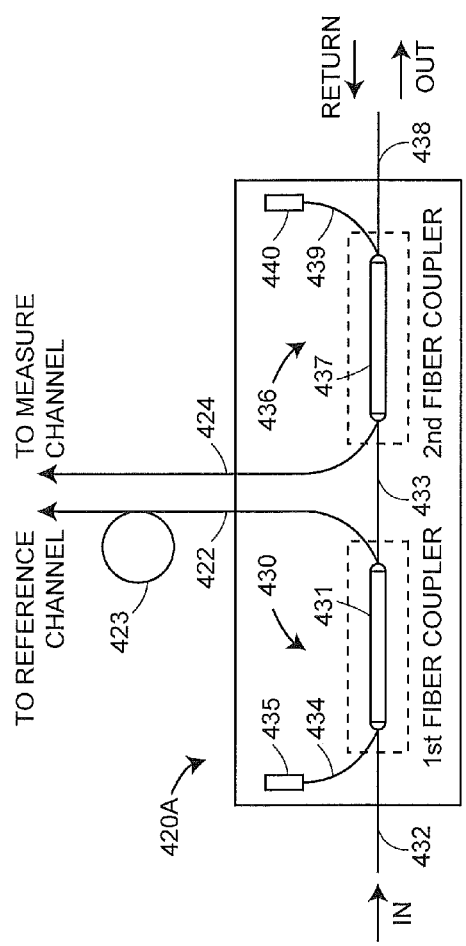
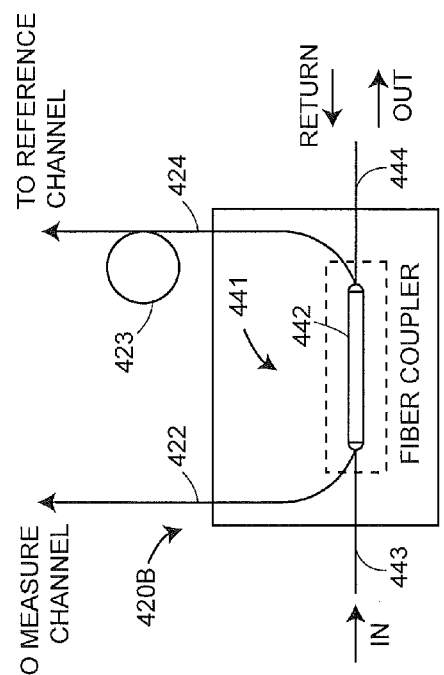
PRIOR ART
FIGURE 8A
PRIOR ART
FIGURE 8B

LASER TRACKER USED WITH SIX DEGREE-OF-FREEDOM PROBE HAVING SEPARABLE SPHERICAL RETROREFLECTOR

CROSS REFERENCE TO RELATED APPLICATIONS

The present application claims the benefit of U.S. Provisional Patent Application No. 61/592,049, filed Jan. 30, 2012, the contents of which are hereby incorporated by reference. The present application also claims the benefit of U.S. patent application Ser. No. 13/407,983, filed Feb. 29, 2012, which claims the benefit of U.S. Provisional Patent Application No. 61/448,823, filed Mar. 3, 2011, the contents of which are hereby incorporated by reference. The U.S. patent application Ser. No. 13/407,983 also claims the benefit of U.S. patent application Ser. No. 13/370,339, filed Feb. 10, 2012, which claims the benefit of U.S. Provisional Patent Application No. 61/442,452, filed Feb. 14, 2011, the contents of which are hereby incorporated by reference. The U.S. patent application Ser. No. 13/407,983 also claims the benefit of U.S. Provisional Patent Application No. 61/475,703, filed 15 Apr. 2011, and U.S. Provisional Patent Application No. 61/592,049, filed Jan. 30, 2012, the contents of which are hereby incorporated by reference.

BACKGROUND

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Coordinate-measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest. The gimbal mechanism used for a laser tracker may be used for a variety of other applications. As a simple example, the laser tracker may be used in a gimbal steering device having a visible pointer beam but no distance meter to steer a light beam to series of retroreflector targets and measure the angles of each of the targets.

Angle measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., the contents of which are herein incorporated by reference, and U.S. Published Patent Application No. 2010/0128259 to Bridges et al., the contents of which are herein incorporated by reference.

In the past, six-DOF probes and SMRs have been separate accessories that were relatively expensive. What is needed is an accessory that is relatively inexpensive and that combines the functionality of an SMR and a six-DOF probe.

SUMMARY

A method for measuring three-dimensional coordinates of a probe center includes the steps of: providing a spherically mounted retroreflector, the spherically mounted retroreflector including a retroreflector mounted in a retroreflector body, the retroreflector body having a first spherical shape over a first portion of its outer surface, the first portion having a target center, the retroreflector configured to receive a first beam of light and to return a second beam of light, the second beam of light being a portion of the first beam of light, the second beam of light traveling in a direction substantially opposite the direction of the first beam of light. The method also includes: providing a probe assembly, the probe assembly including a probe stylus and a probe head, the probe stylus including the probe tip, the probe tip having a second spherical shape over a second portion of its surface, the second portion having a probe center, the probe head configured to receive the spherically mounted retroreflector and to permit rotation of the spherically mounted retroreflector about the target center while keeping the target center at a substantially constant position relative to the probe assembly. The method further includes: providing an orientation sensor, the orientation sensor configured to measure three orientational degrees of freedom of the probe assembly; providing a coordinate measurement device, the coordinate measurement device including a first motor, a second motor, a first angle measuring device, a second angle measuring device, a distance meter, a position detector, a control system, and a processor, the first motor and the second motor configured together to direct the first beam of light to a first direction, the first direction determined by a first angle of rotation about a first axis and a second angle of rotation about a second axis, the first angle of rotation produced by the first motor and the second angle of rotation produced by the second motor, the first angle measuring device configured to measure the first angle of rotation and the second angle measuring device configured to measure the second angle of rotation, the distance meter configured to measure a first distance from the coordinate measurement device to the spherically mounted retroreflector based at least in part on a third portion of the second beam of light received by a first optical detector, the position detector configured to produce a first signal in response to a position of a fourth portion of the second beam of light on the position detector, the control system configured to send a second signal to the first motor and a third signal to the second motor, the second signal and the third signal based at least in part on the first signal, the control system configured to adjust the first direction of the first beam of light to the position in space of the spherically mounted retroreflector, the processor configured to determine three-dimensional coordinates of the probe center, the three-dimensional coordinates based at least in part on the first distance, the first angle of rotation, the second angle of rotation, and the three orientational degrees of freedom. The method also includes: placing the spherically mounted retroreflector on the probe head; directing the first beam of light from the coordinate measurement device to the spherically mounted retroreflector; measuring the first distance; measuring the first angle of rotation; measuring the second angle of rotation; measuring the three orientational degrees of freedom based at least in part on information provided by the orientation sensor; calculating the three-dimensional coordinates of the probe center based at least in part on the first distance, the first angle of rotation, the second angle of rotation, and the three orientational degrees of freedom; and storing the three-dimensional coordinates of the probe center.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4A and 4B, shows two types of prior art afocal beam expanders;

FIGS. 6A-D are schematic figures that show four types of prior art position detector assemblies;

FIGS. 8A and 8B are schematic figures showing fiber-optic elements within a prior art fiber-optic network;

DETAILED DESCRIPTION

Figure 1:
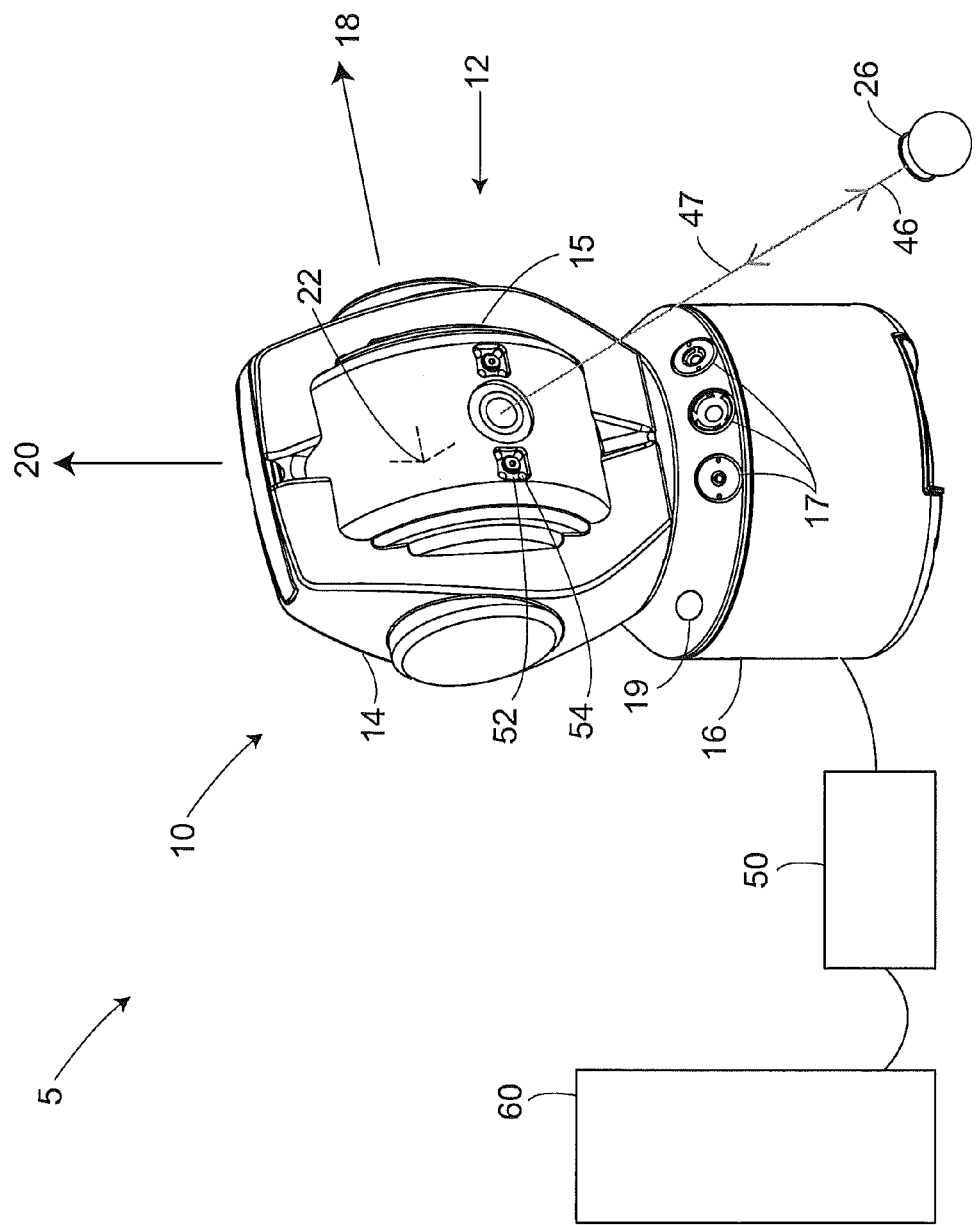
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
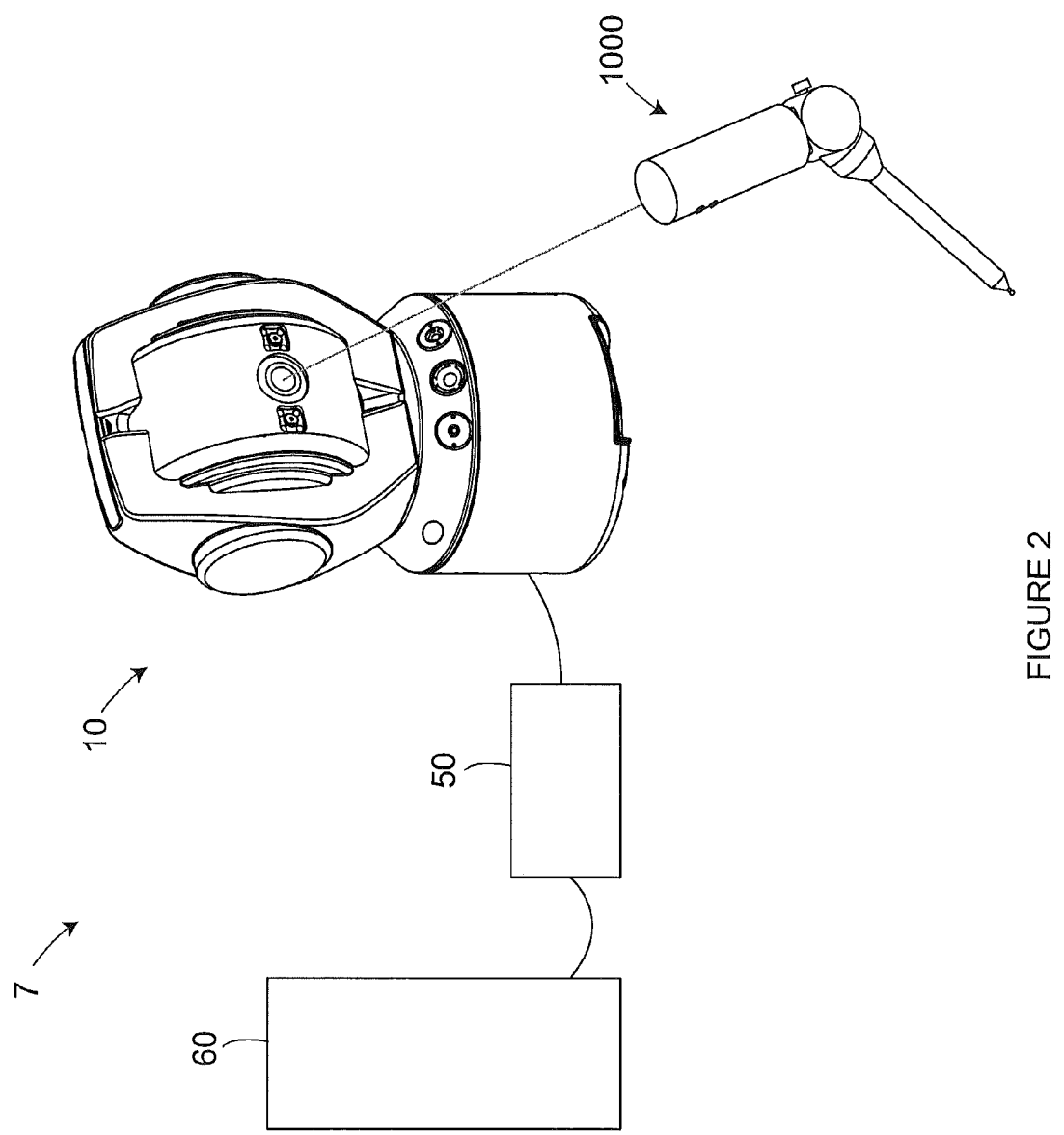
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
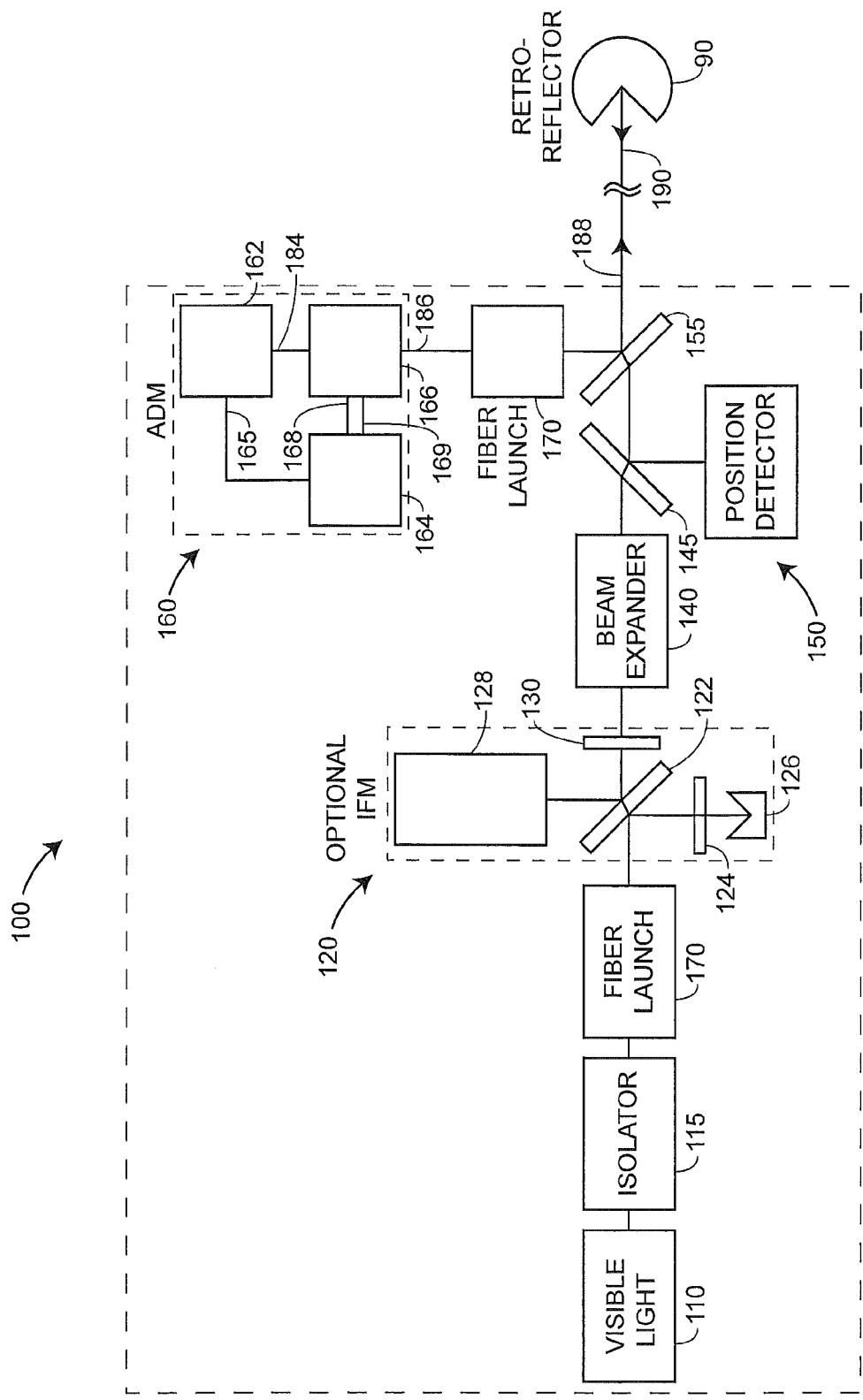
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed herein below with reference to FIG. 5.

Figure 4:
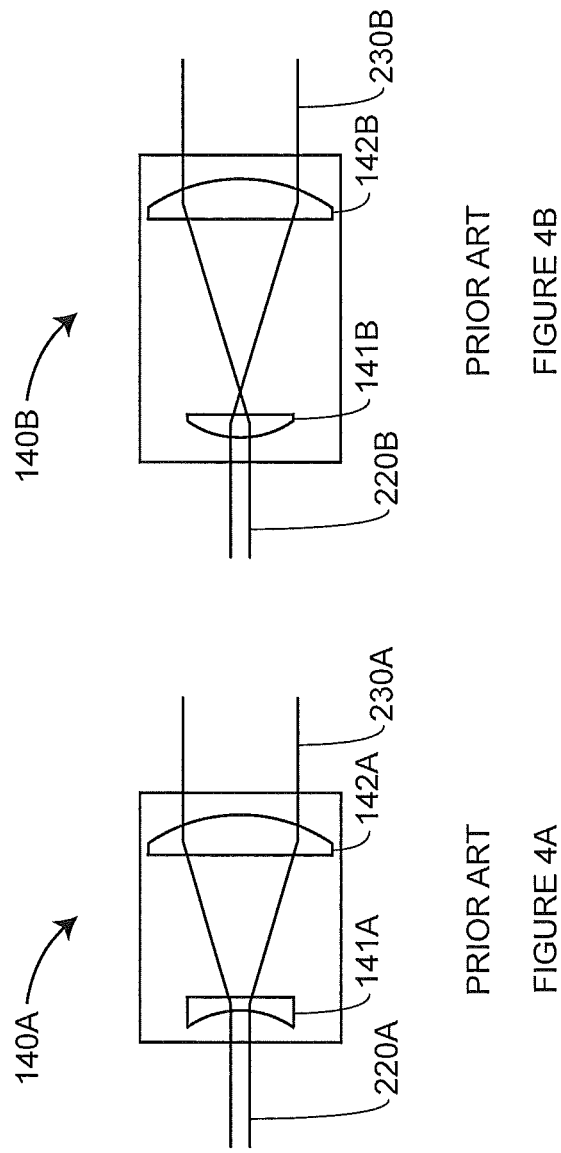
FIG. 4, which includes

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
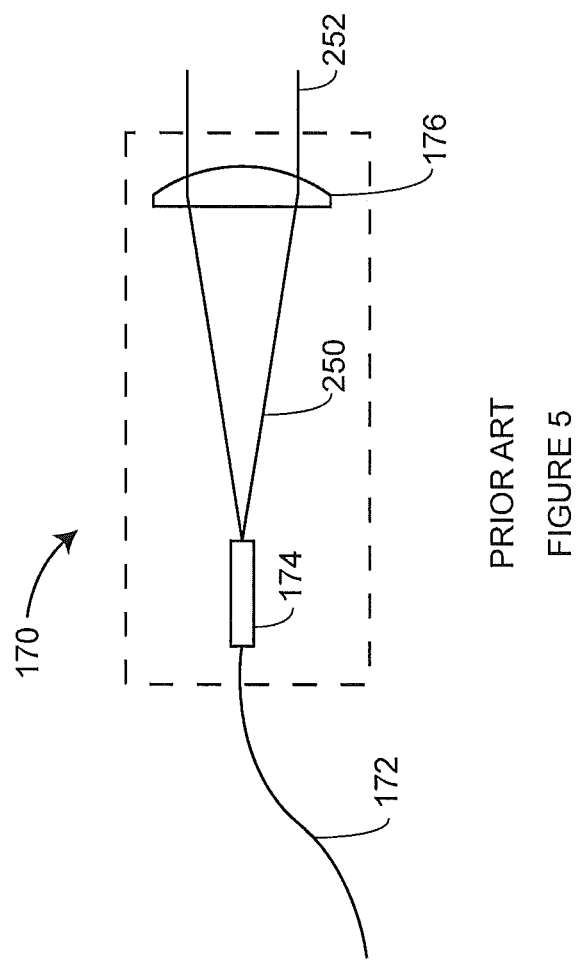
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
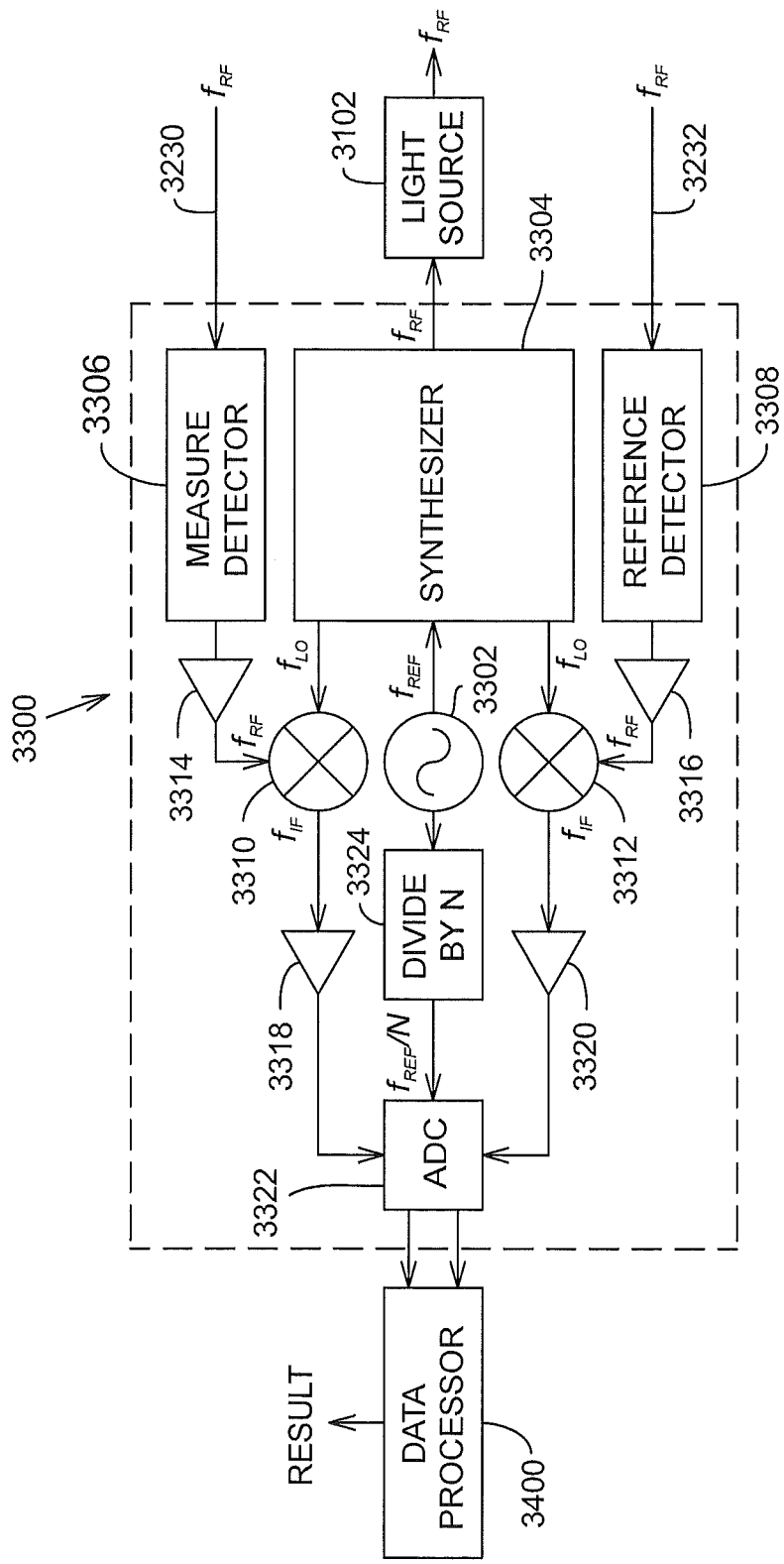
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_a$). The signal fRF goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{if}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Figure 6F:
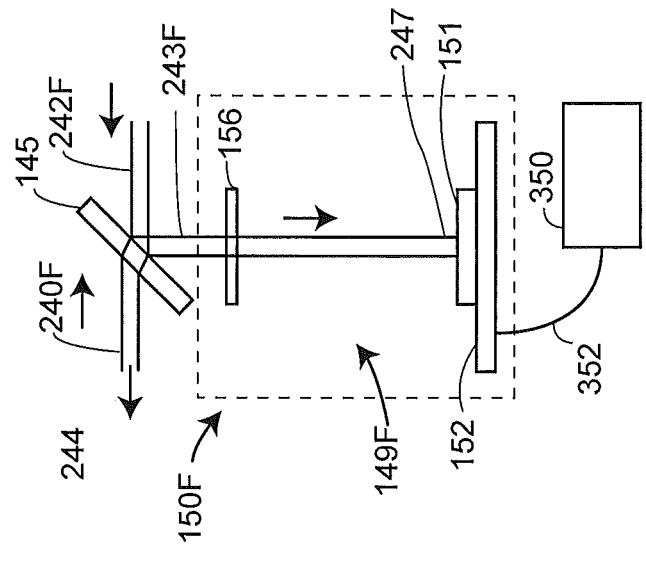
FIGS. 6E and 6F are schematic figures showing position detector assemblies according to embodiments of the present invention.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
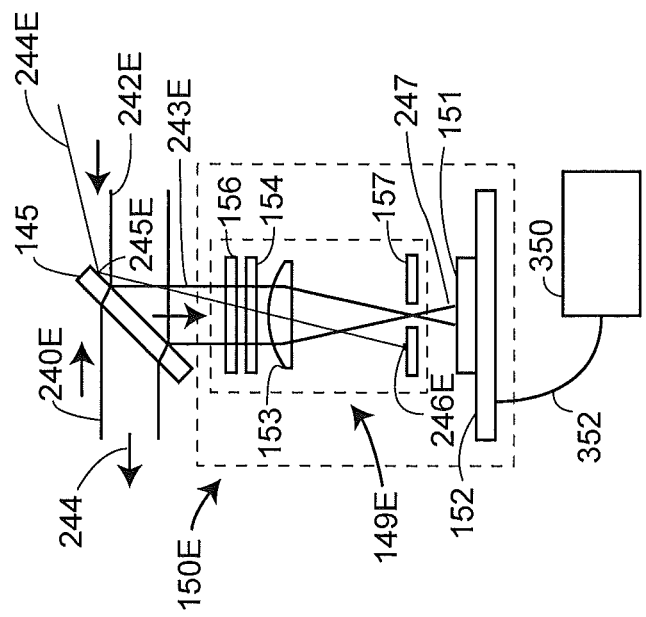

FIG. 6E shows a position detector assembly according to embodiments of the present invention that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. patent application Ser. No. 13/370,339 ('339) filed Feb. 10, 2012, and Ser. No. 13/407,983 ('983), filed Feb. 29, 2012, the contents of which are incorporated by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
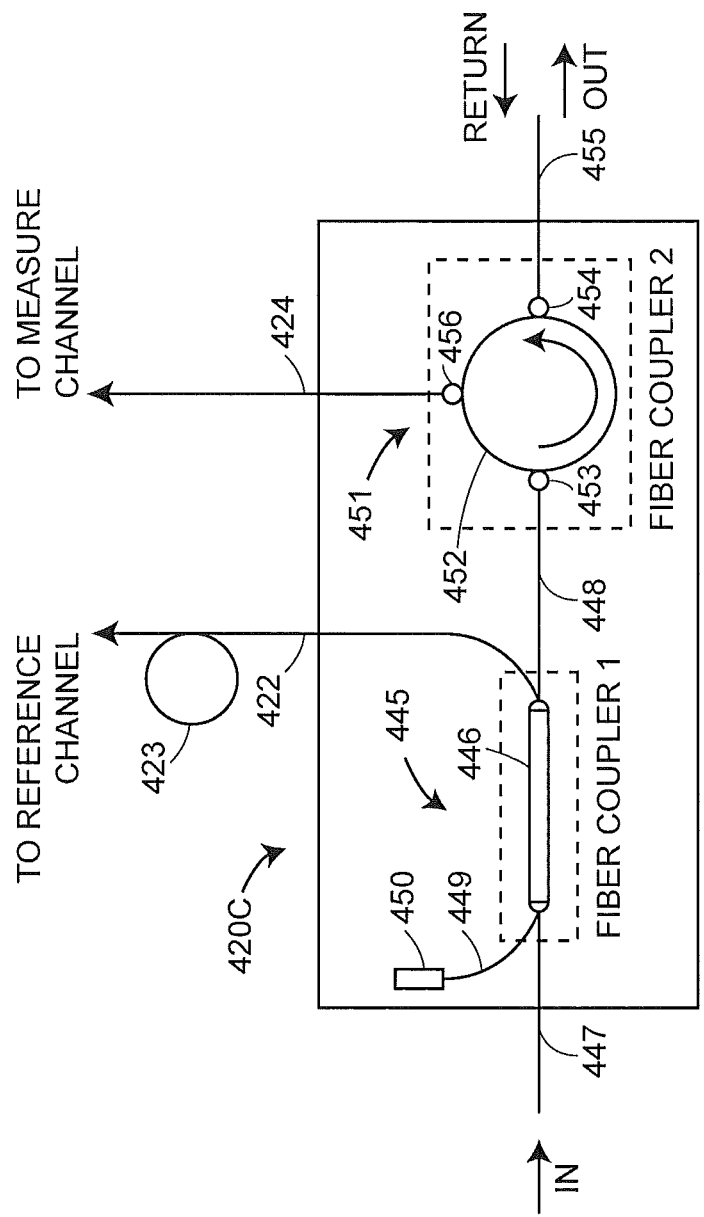
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
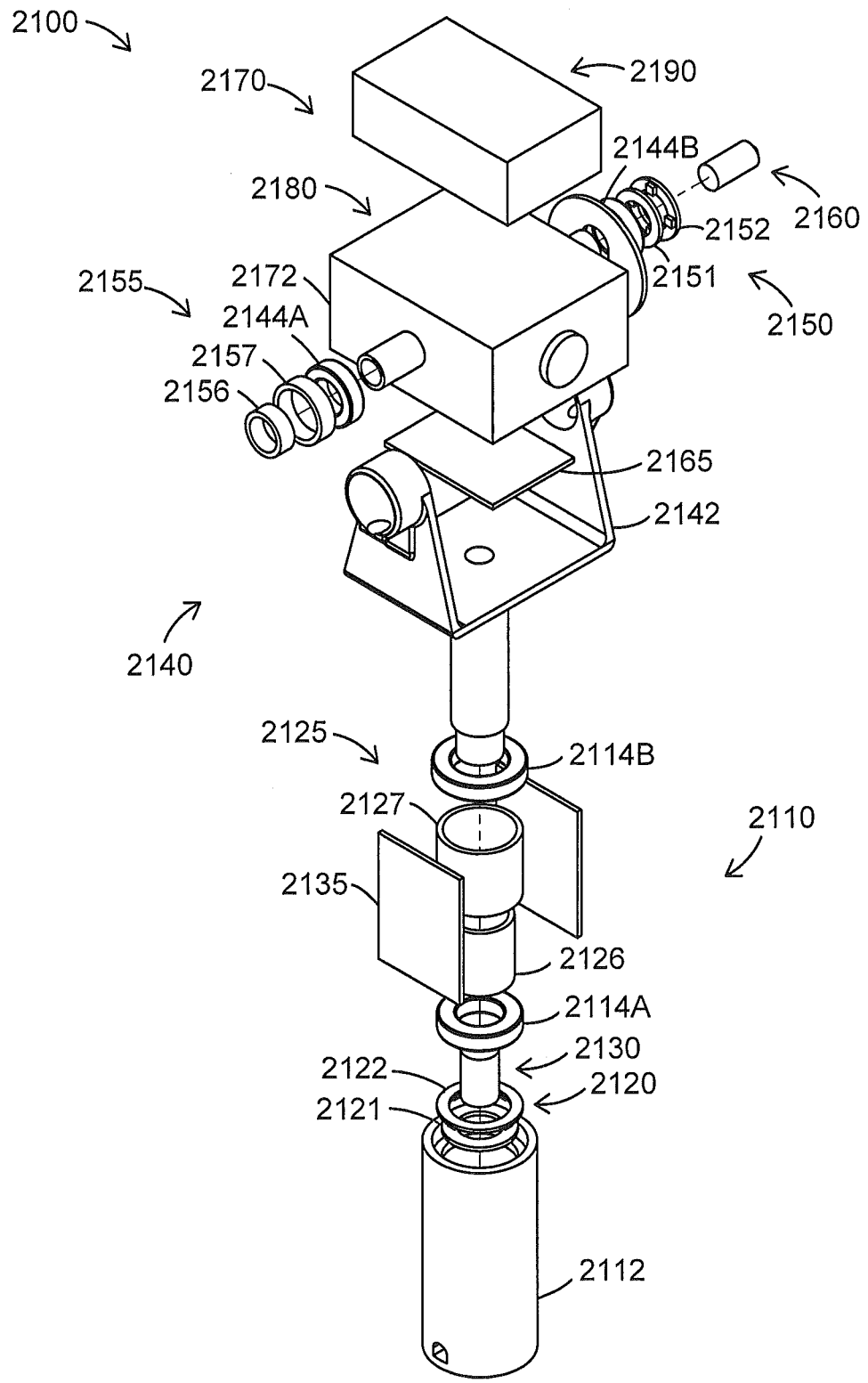
FIG. 9 is an exploded view of a prior art laser tracker.
Figure 10:
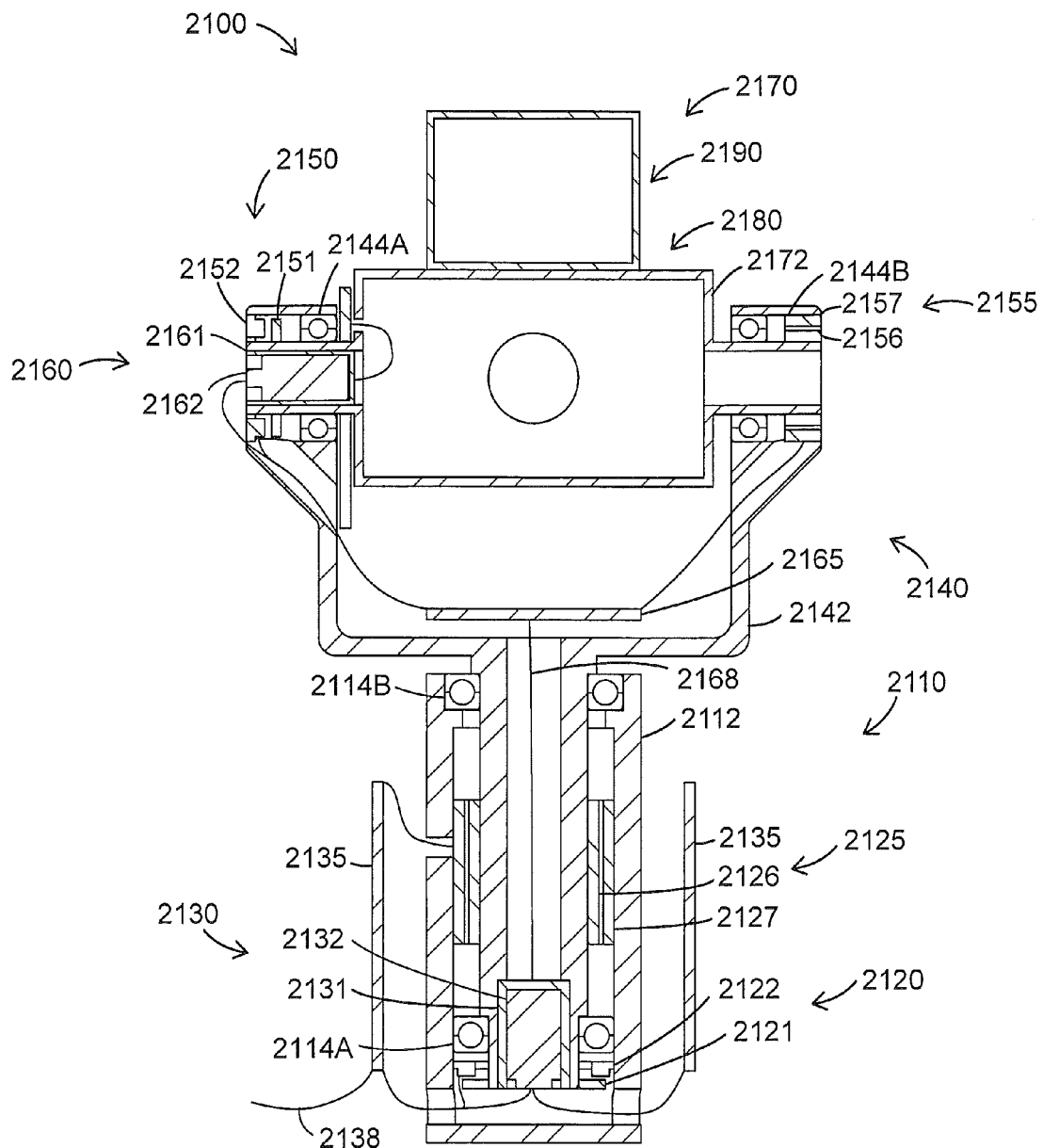
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Published Patent Application No. 2010/0128259 to Bridges et al., incorporated by reference. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
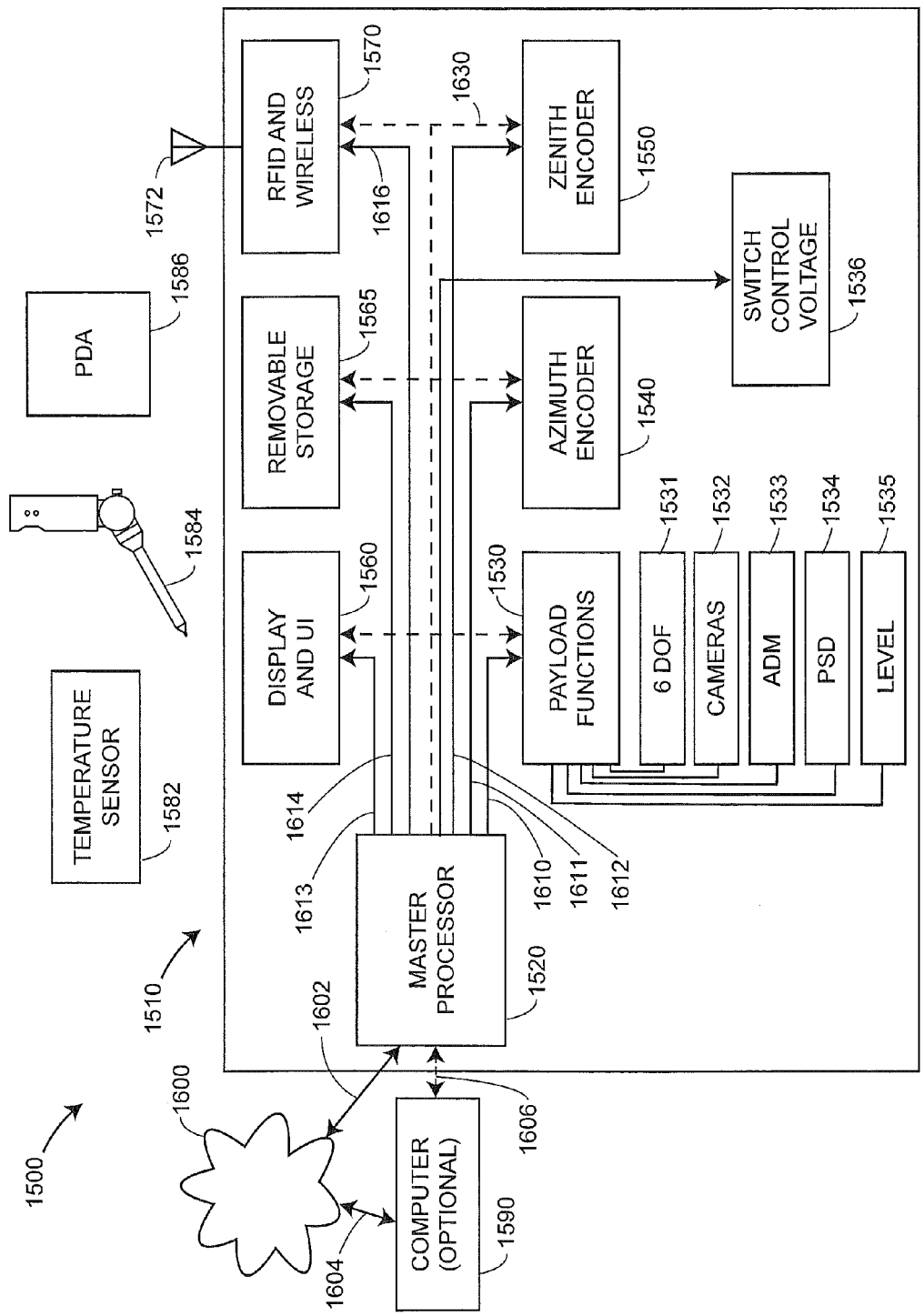
FIG. 11 is a block diagram of the computing and communication elements of a laser tracker in accordance according to an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in optoelectronic system 500 of FIG. 12A.

Figure 12A:
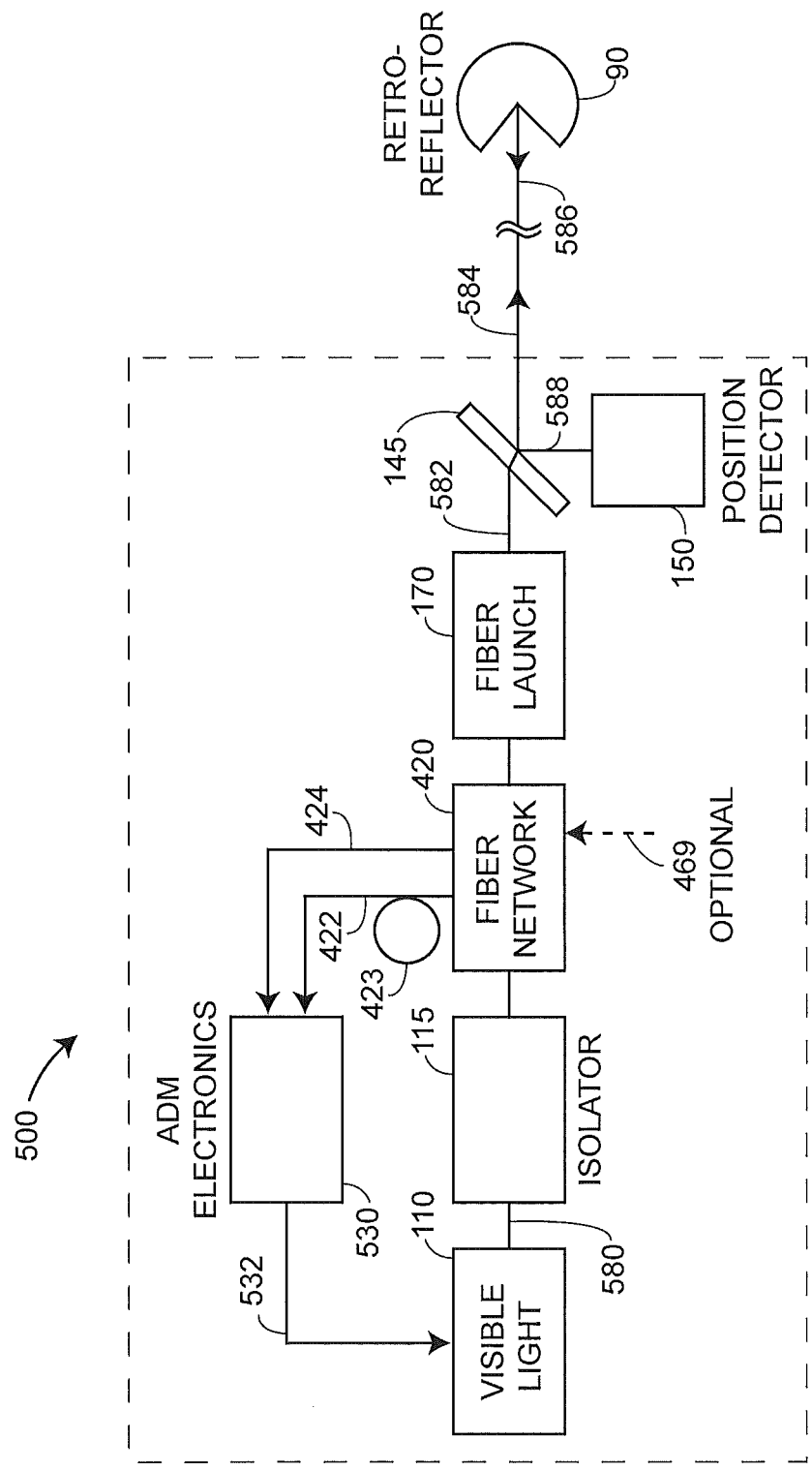
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
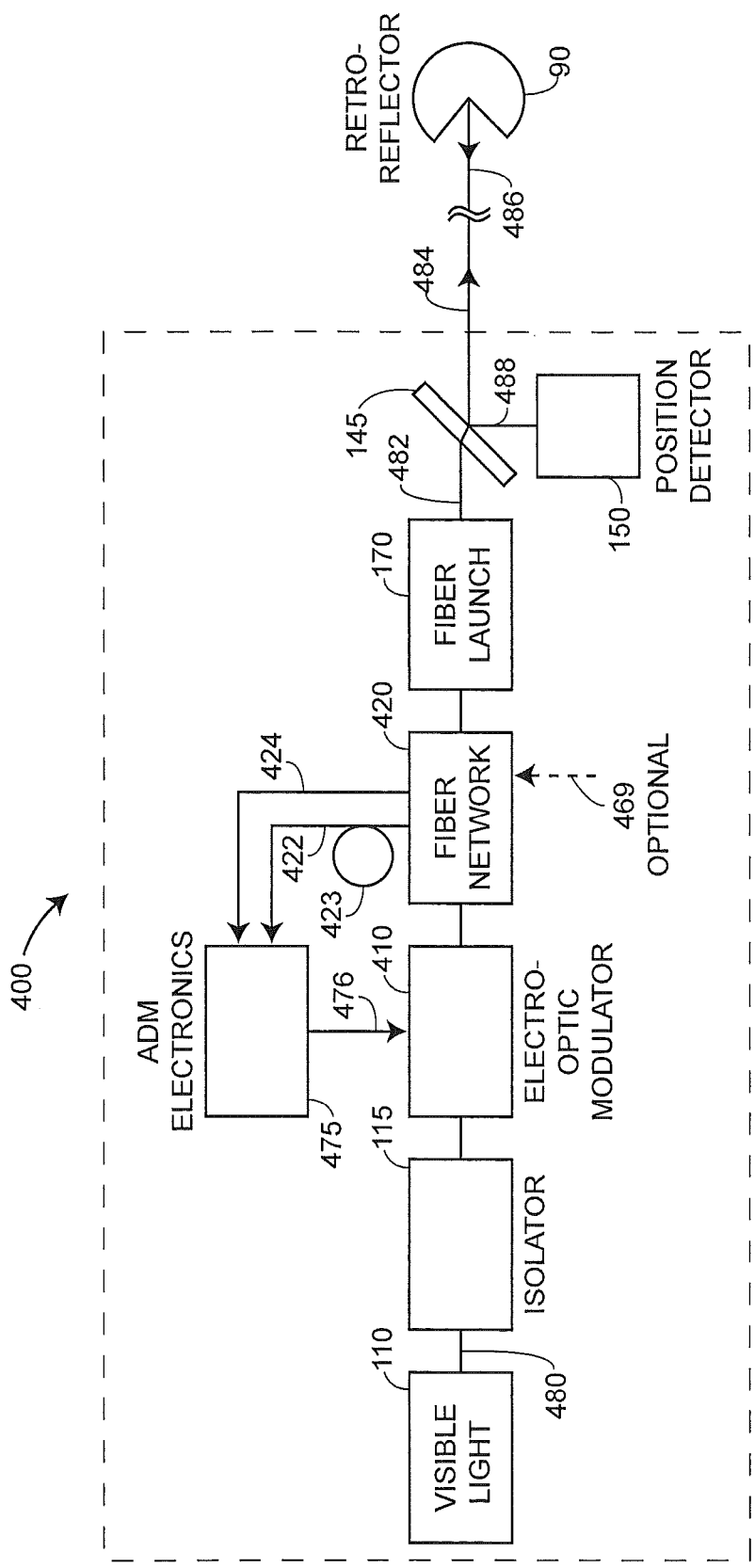
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
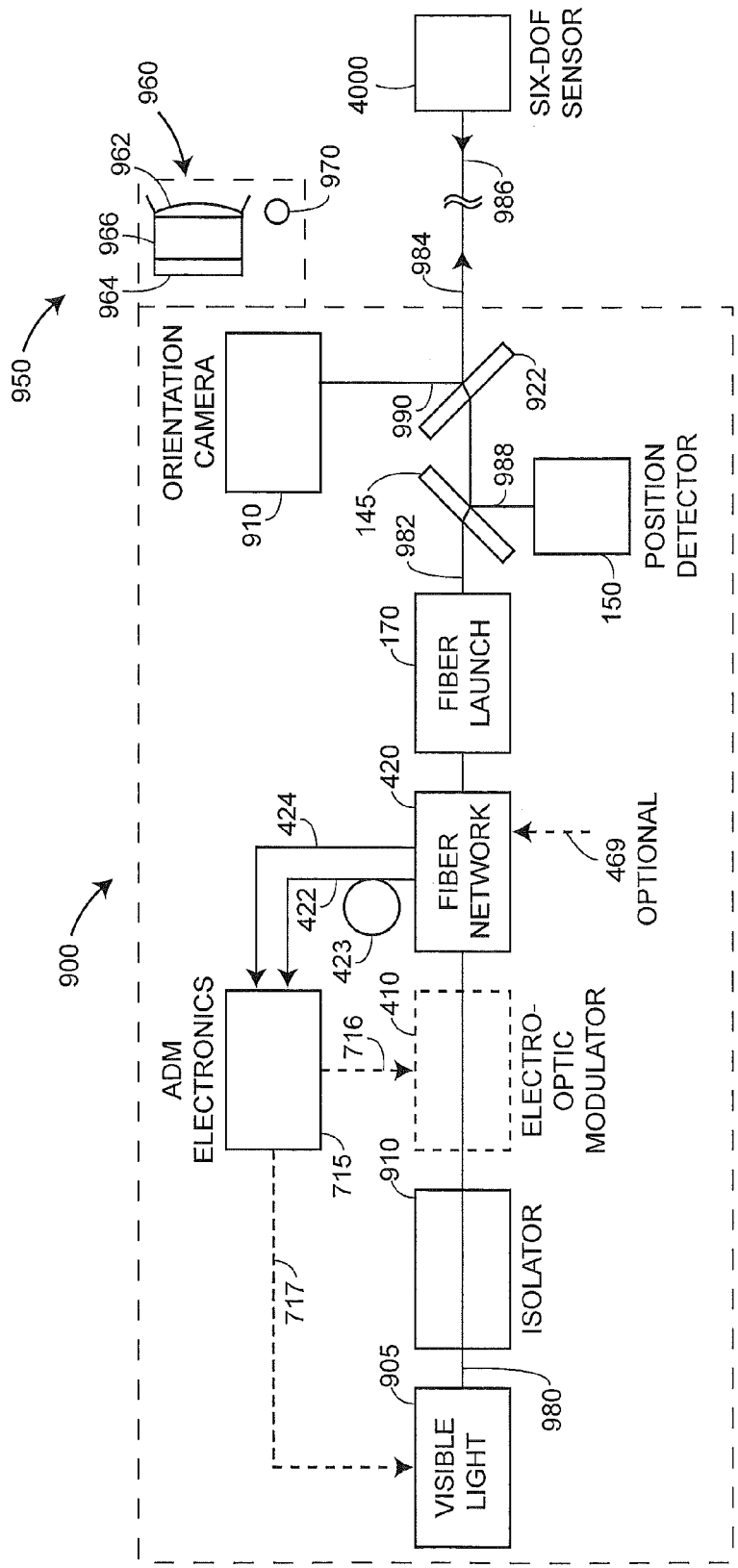
FIG. 13 is a block diagram of elements in a laser tracker with six-DOF capability according to an embodiment of the present invention.

FIG. 13 shows an embodiment of a locator camera system 950 and an optoelectronic system 900 in which an orientation camera 910 is combined with the optoelectronic functionality of a 3D laser tracker to measure six degrees of freedom. The optoelectronic system 900 includes a visible light source 905, an isolator 910, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 910, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beamsplitter 145 and is lost. A portion of the light passes through the beam splitter 145, through the beam splitter 922, and travels out of the tracker to six degree-of-freedom (DOF) device 4000. The six-DOF device 4000 may be a probe, a scanner, a projector, a sensor, or other device.

On its return path, the light from the six-DOF device 4000 enters the optoelectronic system 900 and arrives at beamsplitter 922. Part of the light is reflected off the beamsplitter 922 and enters the orientation camera 910. The orientation camera 910 records the positions of some marks placed on the retroreflector target. From these marks, the orientation angle (i.e., three degrees of freedom) of the six-DOF probe is found. The principles of the orientation camera are described hereinafter in the present application and also in patent '758. A portion of the light at beam splitter 145 travels through the beamsplitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The locator camera system is also shown in FIG. 1, where the cameras are elements 52 and the light sources are elements 54. The camera includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems are available on the laser tracker, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

Figure 14:
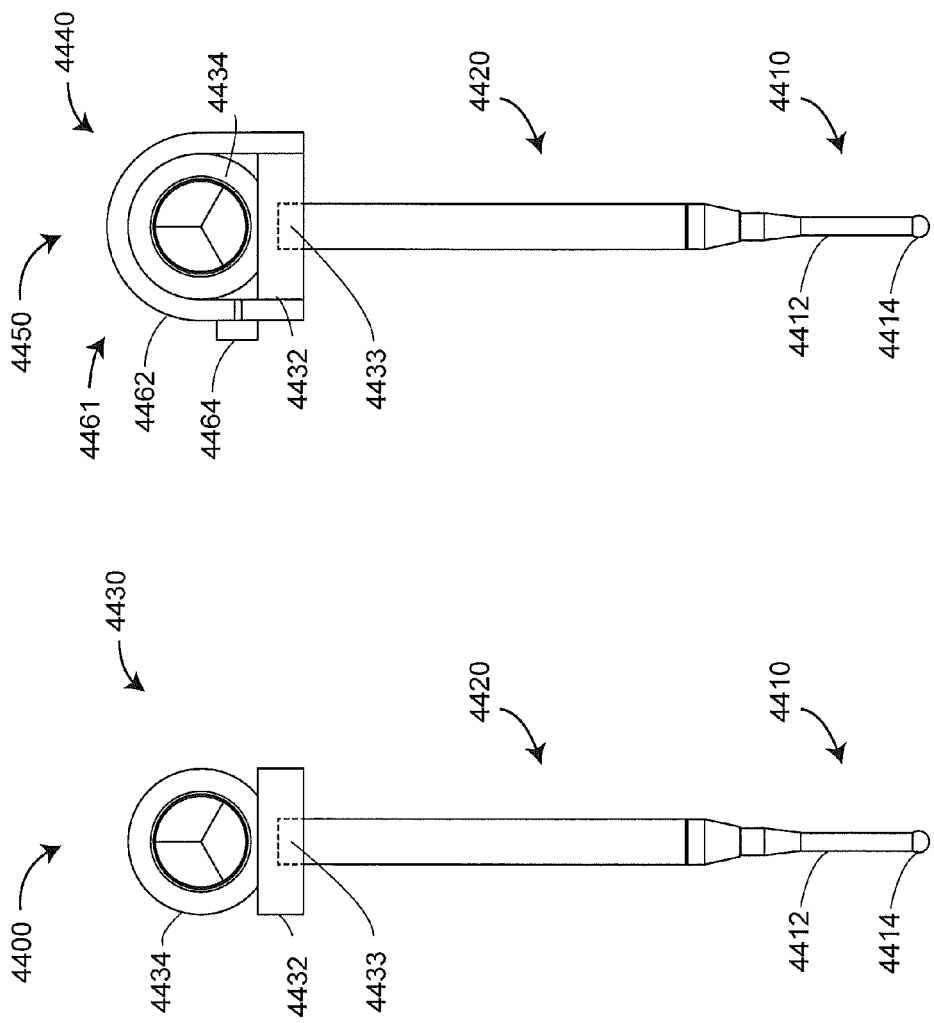
FIGS. 14A and 14B are front views of a six-DOF SMR magnetically attached to a six-DOF probe base and a six-DOF SMR clamped onto a six-DOF probe base, respectively, according to an embodiment of the present invention.

FIG. 14A shows an embodiment of a six-DOF probe 4400. The probe 4400 includes a six-DOF SMR 4434 placed on a magnetic nest 4432 that includes a strong magnet 4433. The six-DOF probe 4400 includes a stylus 4410, a body 4420, and a head 4430. The stylus 4410 includes a probe tip 4414 and a probe shaft 4412. The head 4430 includes the magnetic nest 4432 configured for rotating the six-DOF SMR 4434 about the SMR center but without translating the SMR center. The six-DOF SMR 4434 may be used advantageously as a stand-alone target. In this way a six-DOF SMR 4434 and six-DOF probe 4400 are both obtained for almost the same price as the six-DOF SMR alone. In an embodiment, the six-DOF SMR includes lines of intersection among the reflecting surfaces, the lines of intersection visible to an orientation camera such as the camera 910. Aspects of a six-DOF SMR are discussed in more detail in patent applications '339 and '983. In general, the six-DOF laser tracker has the ability to measure six degrees of freedom of a probe having a retroreflector target. One way of obtaining such a six-DOF measurement, as described hereinabove, is to incorporate marks into a cube corner retroreflector and to view these marks with an orientation camera to determine the three orientational degrees of freedom of the six-DOF SMR or six-DOF probe.

Other methods of determining the three orientational degrees of freedom may be used. In the present application, the term orientation sensor shall be applied to all such devices capable of being used with a laser tracker to determine the three orientational degrees of freedom. A first example of an alternative method for determining the three orientational degrees of freedom is to place at least three points of light on a probe that contains a retroreflector. By observing the points of light, it is with some configurations possible to determine the three orientational degrees of freedom. A second example of an alternative method for determining three orientational degrees of freedom is to use a combination of two sensor methods. A first sensor method is to allow a small quantity of light striking a cube-corner retroreflector to pass through the retroreflector to strike a position detector, which might be a CMOS array or a position sensitive detector, for example. Such a method permits determine of the pitch and yaw angles of the retroreflector, which in an embodiment is attached to a probe assembly. A second sensor method is to use a mechanical pendulum coupled to an angular encoder to measure the orientation of the probe in relation to the gravity vector. This measurement gives an angle that is closely related to the roll angle of the probe. By combining the results of the first sensor and the second sensor, it is possible to obtain the three orientational degrees of freedom. Whatever method is used, the idea of incorporating a separable SMR from the measurement device may be applied. In all cases, the term orientation sensor represents the apparatus needed to measure the three orientational degrees of freedom.

FIG. 14B shows an embodiment of a six-DOF probe 4450. It is like the six-DOF probe 4400 except that it includes a constraint 4460. The constraint includes an element that comes in contact with the six-DOF SMR 4434—for example, a machined piece of metal, a plastic cover, or a strap. The constraint 4460 is brought into tight physical contact with the six-DOF SMR 4434 by means of a securing mechanism 4464. Examples of suitable securing mechanisms include hooking clamps and screw clamps. Two possible advantages of including a clamping mechanism are decreased chance of moving the six-DOF SMR, which might require repeating the compensation procedure described herein below, and decreased chance of bumping the SMR off of the probe and onto the floor. The magnet 4433 shown in FIG. 14B is optional.

An advantage of the probe embodiments shown in FIGS. 14A-B is that six-DOF probing capability can be added to six-DOF SMR capability for very low cost. Another advantage is that these embodiments require no source of electrical power since the six-DOF SMR may be used in a completely passive manner if desired.

Figure 15:
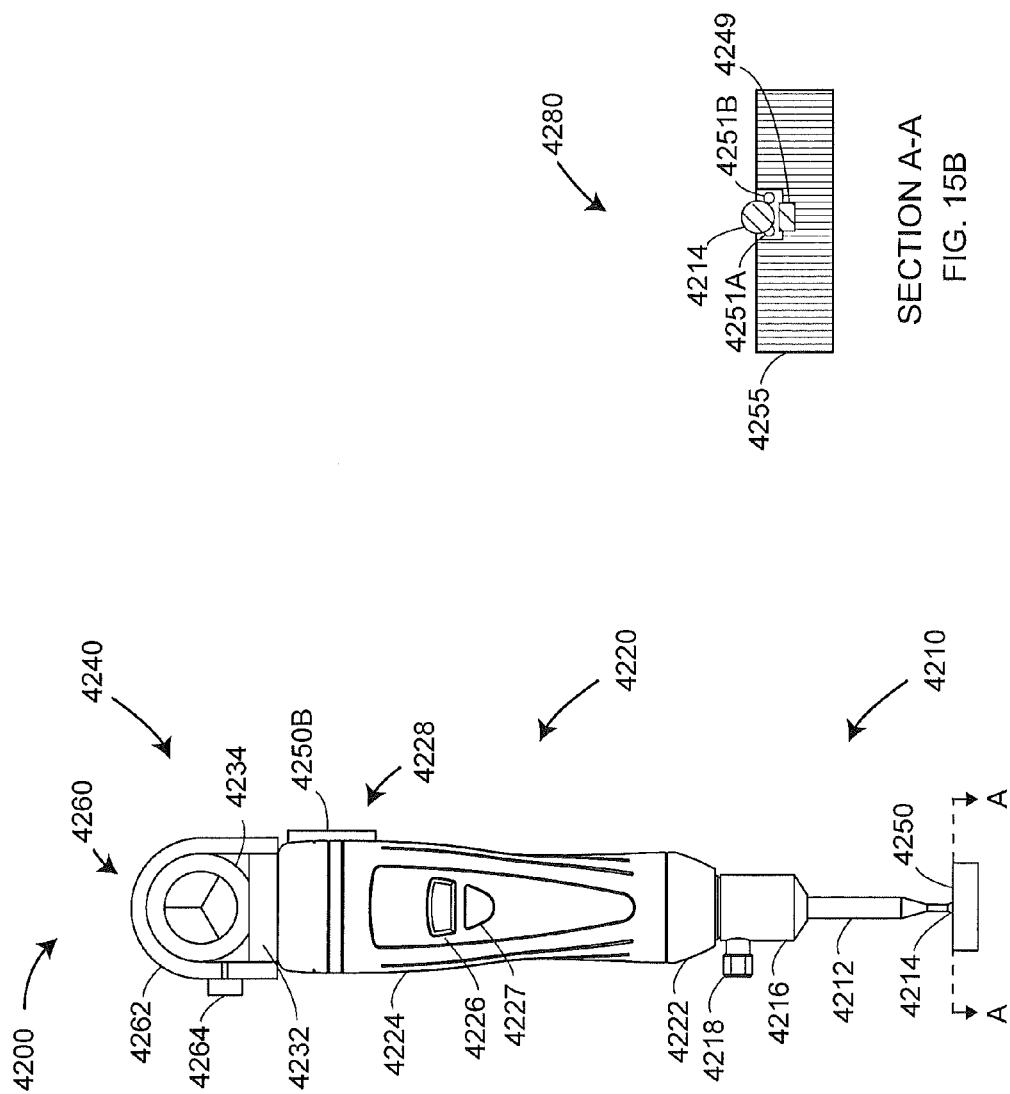
FIG. 15A is a front view of a probe assembly and a six-DOF SMR placed on a compensation fixture.
FIG. 15B is a cross-sectional view of the compensation fixture according to an embodiment of the present invention.

An embodiment of a six-DOF probe 4200 is shown in FIG. 15A. The probe includes a probe head 4240, a probe body 4220, and a probe stylus 4210. The six-DOF SMR 4234 is held in place by a constraint 4260. The constraint 4260 includes an element 4262 that comes in contact with the six-DOF SMR 4234. The element 4262 may be, for example, a machined piece of metal, a plastic cover, or a strap. The constraint 4260 is brought into tight physical contact with the six-DOF SMR 4234 by means of a securing mechanism 4264. Examples of suitable securing mechanisms include hooking clamps and screw clamps. The six-DOF SMR 4234 sits on a nest base 4332, which in an embodiment is magnetic. The probe body 4220 includes a housing 4224, optional actuator buttons 4226, 4227, and optional nest storage 4228. The probe housing 4224 is contoured to be held by a hand. The probe stylus 4210 includes a probe tip 4214, a probe shaft 4212, a probe connector 4216, and a probe clamp 4218. The probe clamp enables a variety of styluses having different lengths, angles, and shapes to be attached to the six-DOF probe.

Figure 17:
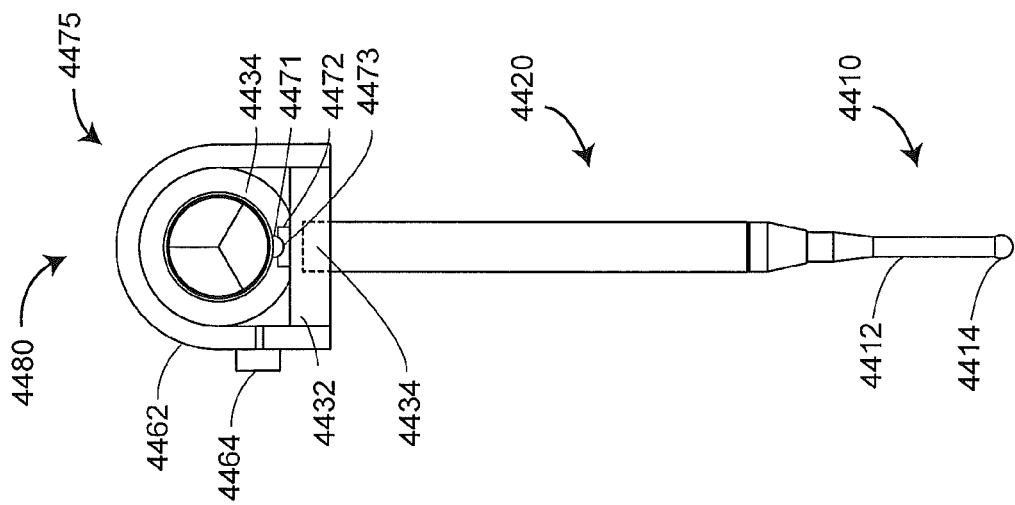
FIG. 17 is a front view of a probe assembly and a six-DOF SMR, the probe assembly and SMR having indexing and mating features according to an embodiment of the present invention.

In an embodiment, the six-DOF SMR 4480 of FIG. 17 includes indexing features 4471, and the probe head 4475 includes a mating structure 4472 that includes mating features 4473. The indexing features and the mating features are configured to fix the orientation of the six-DOF SMR within the nest 4432 without shifting the spherical center of the SMR relative to the six-DOF probe assembly. The use of indexing and mating features of FIG. 17 is that they enable the tracker to be immediately used based on probe compensation parameters obtained from the factory or from a compensation procedure carried out previously.

In another embodiment, the angle of the beam of light from the tracker to the probe body 4420 is changed by rotating the six-DOF SMR 4434, 4234 relative to the body. This may be done by rotating the six-DOF SMR 4434, 4234 on the nest 4432, 4232. To find the angle of rotation of the six-DOF SMR, a compensation procedure may be quickly carried out in which the probe is placed in a fixed nest 4250, as shown in FIG. 15A. The probes in FIGS. 14A and 14B may equally well be used with the compensation procedure described herein. In FIG. 15A, the probe tip 4214 is placed in the fixed nest 4250. The operator may place the fixed nest on any convenient surface and hold it in place with one hand while moving the six-DOF probe 4200 with the other hand, the movement made according to method described herein below.

The fixed nest may be any of several types. One type of fixed nest 4250, depicted in the cross-sectional view 4280 of FIG. 15B, includes a body 4255 onto which are embedded three small spheres (two of these are 4251A, 4251B) placed 120 degrees apart and positioned to support the probe tip 4214 or 4414. A small magnet 4249 may be placed in the fixed nest 4250 to provide a downward force on the probe tip 4214, 4414. The three small spheres hold the center of the spherical probe tip fixed in space but allow the six-DOF probe 4200, 4400, or 4450 to be rotated to any desired angle. Because the center of the probe tip remains fixed, the calculated value of the probe tip should remain constant regardless of the rotation angles of the six-DOF probes. This makes it possible to solve for the orientation of the six-DOF SMR with respect to the rest of the probe. Another name for a nest containing three small spheres spaced 120 degrees apart is "trihedral hollow."

Other types of nest configurations may be used. In an embodiment, small protrusions are used rather than small spheres. Such protrusions are used, for example, in the nests 17 of FIG. 1. In another embodiment, the fixed nest includes a conical seat. As the name suggests, a conical seat includes a cone, usually with regions of the cone provided for making contact with the probe tip. If designed correctly, nests of the sort shown in FIG. 17 or nests formed as conical seats can provide good performance. Usually, the trihedral hollow provides the best possible performance.

Figure 16:
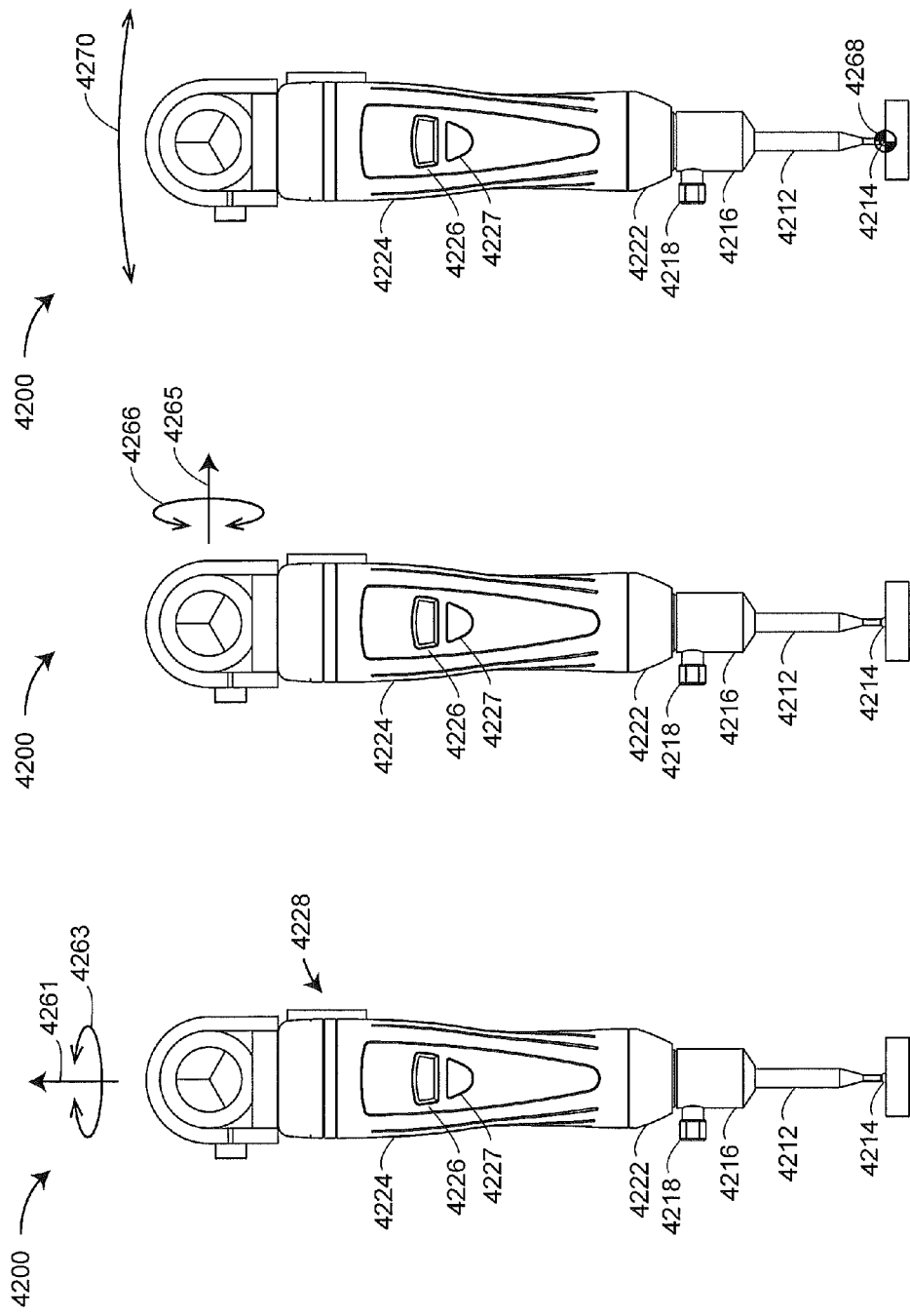
FIGS. 16A-C are front views indicating the yaw, pitch, and roll movements of the six-DOF probe to obtain compensation parameters according to an embodiment of the present invention.

In its position in FIG. 14A, 14B, or 15A, the six-DOF SMR has no free degrees of translational freedom, but it has three degrees of orientational freedom. In an embodiment, the probe is rotated about three different axes to obtain the information needed to determine the values of the three orientational degrees of freedom. For convenience we can let the three angular degrees of freedom be the yaw angle, the pitch angle, and the roll angle. The yaw angle 4263 is the angle of rotation about the axis 4261 that passes through a reference direction of the six-DOF probe. In an embodiment, the reference axis passes through the center of the body 4220 and the center of the stylus 4210. However, the stylus need not be arranged in this way and may instead be placed at any desired angle. The pitch angle is the angle 4266 about the axis 4265, as shown in FIG. 16B. The roll angle is the angle 4270 about the point that passes through 4268 and is perpendicular to the axes 4261 and 4265. The roll angle in this case is not the roll angle of the six-DOF SMR but rather a system-level roll angle. However, the information obtained from performing the rotations of FIGS. 16A, 16B, and 16C is sufficient to determine the orientation of the six-DOF SMR relative to the rest of the probe assembly. In general, it is important to rotate to cover three angles such as the yaw, pitch, and roll angles to get enough information to determine the orientation of the six-DOF SMR on the probe assembly, and this in turn is needed to determine the coordinates of the probe tip as it is moved to points on the surface of a workpiece.

The probe assembly may be conveniently attached to the six-DOF probe body for storage while the six-DOF probe is used to perform measurements. FIG. 15A shows a fixed nest 4250B magnetically attached to a location 4228 on the probe body 4220. It would also be possible to attach the probe body to the probe with a tether or a mechanical snap-on. Of course, the fixed nest 4250 may simply be kept nearby and made available when needed.

Figure 18:
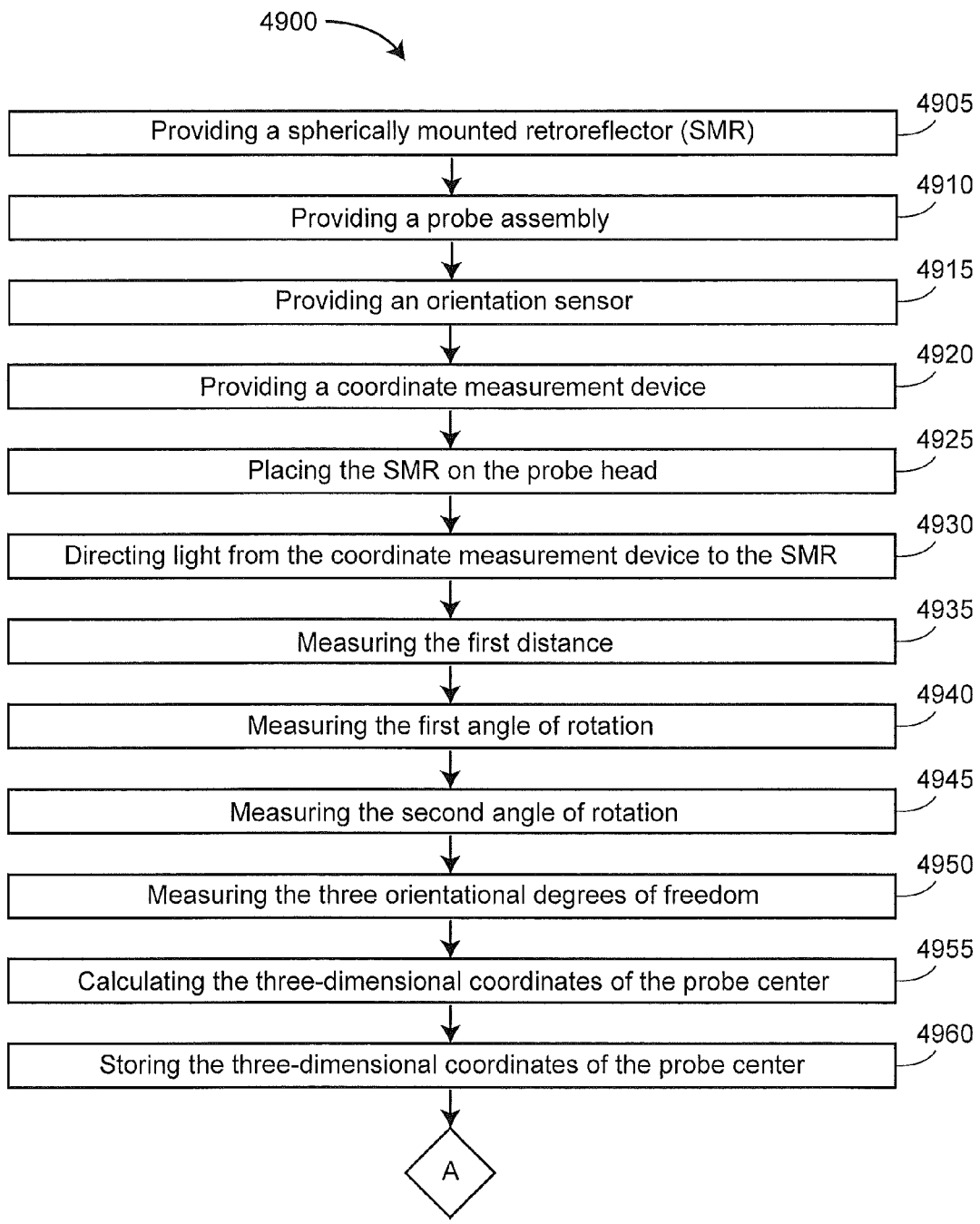
FIG. 18 is a flow chart of a method for measuring three-dimensional coordinates according to an embodiment of the present invention.

FIG. 18 is a flow chart of a method 4900 for measuring three-dimensional coordinates of a probe center. A step 4905 is providing a spherically mounted retroreflector, the spherically mounted retroreflector including a retroreflector mounted in a retroreflector body, the retroreflector body having a first spherical shape over a first portion of its outer surface, the first portion having a target center, the retroreflector configured to receive a first beam of light and to return a second beam of light, the second beam of light being a portion of the first beam of light, the second beam of light traveling in a direction substantially opposite the direction of the first beam of light.

A step 4910 is providing a probe assembly, the probe assembly including a probe stylus and a probe head, the probe stylus including the probe tip, the probe tip having a second spherical shape over a second portion of its surface, the second portion having a probe center, the probe head configured to receive the spherically mounted retroreflector and to permit rotation of the spherically mounted retroreflector about the target center while keeping the target center at a substantially constant position relative to the probe assembly.

A step 4915 is providing an orientation sensor, the orientation sensor configured to measure three orientational degrees of freedom of the probe assembly.

A step 4920 is providing a coordinate measurement device, the coordinate measurement device including a first motor, a second motor, a first angle measuring device, a second angle measuring device, a distance meter, a position detector, a control system, and a processor, the first motor and the second motor configured together to direct the first beam of light to a first direction, the first direction determined by a first angle of rotation about a first axis and a second angle of rotation about a second axis, the first angle of rotation produced by the first motor and the second angle of rotation produced by the second motor, the first angle measuring device configured to measure the first angle of rotation and the second angle measuring device configured to measure the second angle of rotation, the distance meter configured to measure a first distance from the coordinate measurement device to the spherically mounted retroreflector based at least in part on a third portion of the second beam of light received by a first optical detector, the position detector configured to produce a first signal in response to a position of a fourth portion of the second beam of light on the position detector, the control system configured to send a second signal to the first motor and a third signal to the second motor, the second signal and the third signal based at least in part on the first signal, the control system configured to adjust the first direction of the first beam of light to the position in space of the spherically mounted retroreflector, the processor configured to determine three-dimensional coordinates of the probe center, the three-dimensional coordinates based at least in part on the first distance, the first angle of rotation, the second angle of rotation, and the three orientational degrees of freedom.

The step 4925 is placing the spherically mounted retroreflector on the probe head.

The step 4930 is directing the first beam of light from the coordinate measurement device to the spherically mounted retroreflector.

The step 4935 is measuring the first distance.

The step 4940 is measuring the first angle of rotation.

The step 4945 is measuring the second angle of rotation.

The step 4950 is measuring the three orientational degrees of freedom based at least in part on information provided by the orientation sensor.

The step 4955 is calculating the three-dimensional coordinates of the probe center based at least in part on the first distance, the first angle of rotation, the second angle of rotation, and the three orientational degrees of freedom.

The step 4960 is storing the three-dimensional coordinates of the probe center. The method 4900 concludes at a reference marker A.

Figure 19:
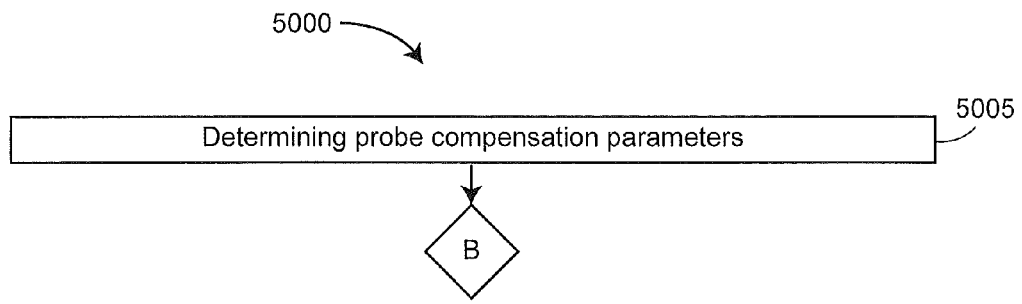
FIG. 19 is a flow chart of a method that begins at reference marker A of FIG. 18, according to an embodiment of the present invention.

FIG. 19 is a flow chart for a method 5000 that begins at reference marker A of FIG. 18 and further includes the step of determining probe compensation parameters, the probe compensation parameters including at least information indicative of an orientation of the spherically mounted retroreflector in relation to the probe assembly.

Figure 20:
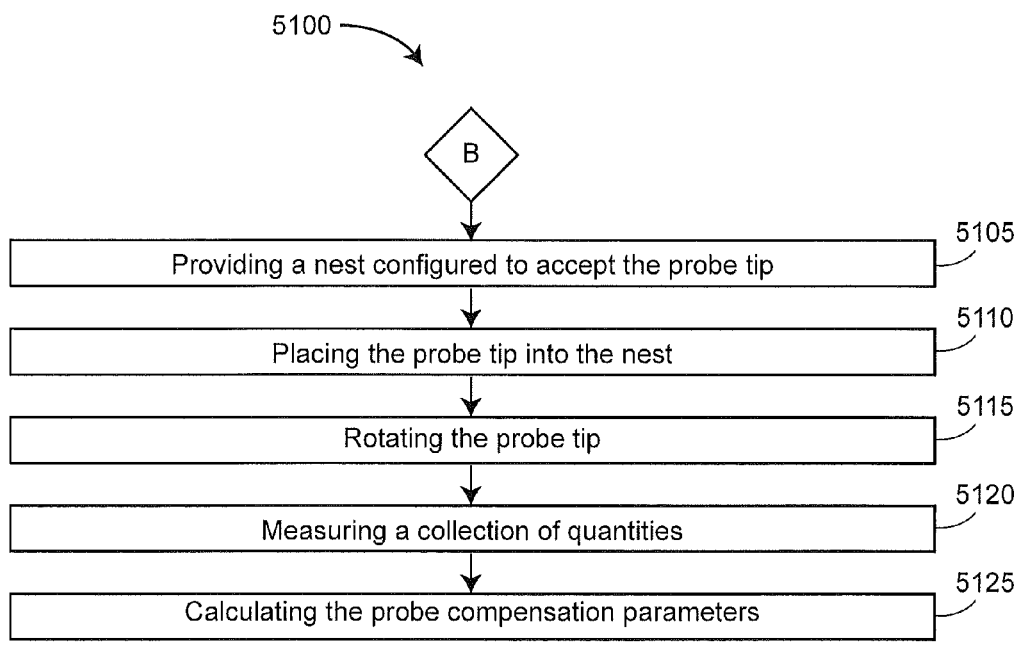
FIG. 20 is a flow chart of a method that begins at reference marker B of FIG. 19, according to an embodiment of the present invention.

FIG. 20 is a flow chart for a method 5100 that begins at reference marker B of FIG. 19. The step 5105 is providing a nest configured to accept the probe tip, the nest further configured to permit rotation of the probe tip about the probe center, the probe center held at a substantially fixed point in space. The step 5110 is placing the probe tip into the nest. The step 5115 is rotating the probe tip. The step 5120 is measuring a collection of quantities, the collection of quantities including the first distance, the first angle of rotation, the second angle of rotation, and the three orientational degrees of freedom, each of the measured values obtained for a plurality of different rotations of the probe tip. The step 5125 is calculating the probe compensation parameters based at least in part on the collection of quantities.

Figure 21:
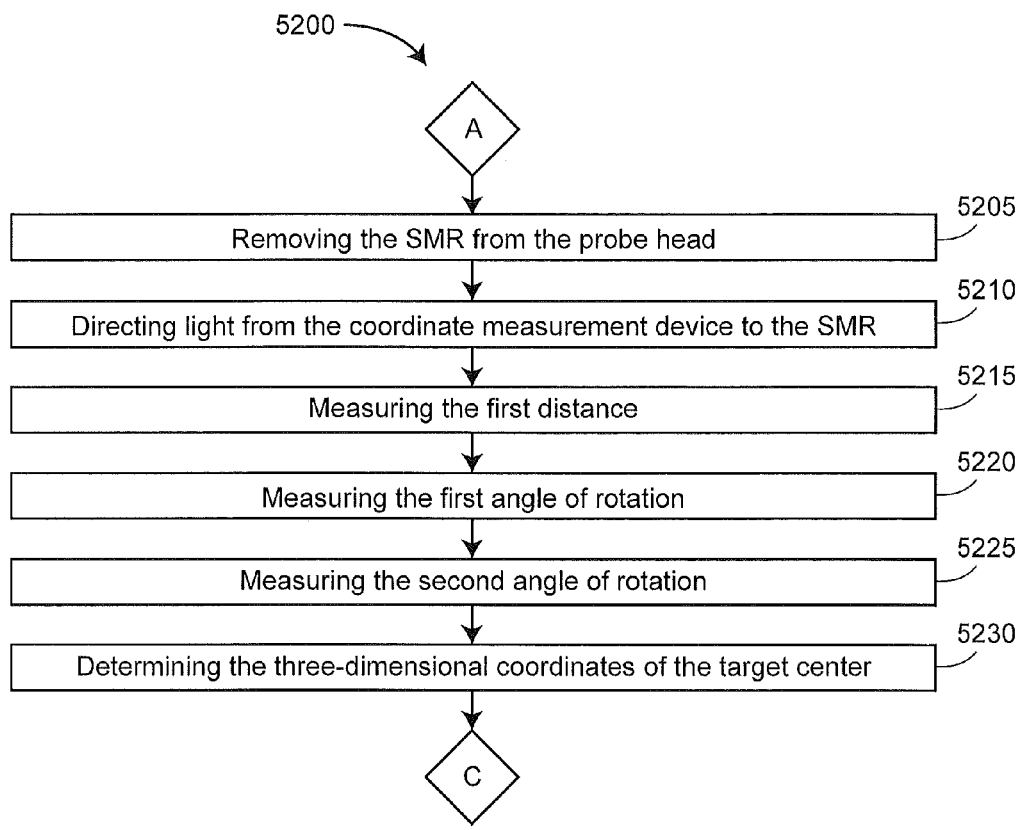
FIG. 21 is a flow chart of a method that begins at reference marker A of FIG. 18, according to an embodiment of the present invention.

FIG. 21 is a flow chart for a method 5200 that begins at reference marker A of FIG. 18. The step 5205 is removing the spherically mounted retroreflector from the probe head. The step 5210 is directing the first beam of light from the coordinate measurement device to the spherically mounted retroreflector. The step 5215 is measuring the first distance. The step 5220 is measuring the first angle of rotation. The step 5225 is measuring the second angle of rotation. The step 5230 is determining the three-dimensional coordinates of the target center.

Figure 22:
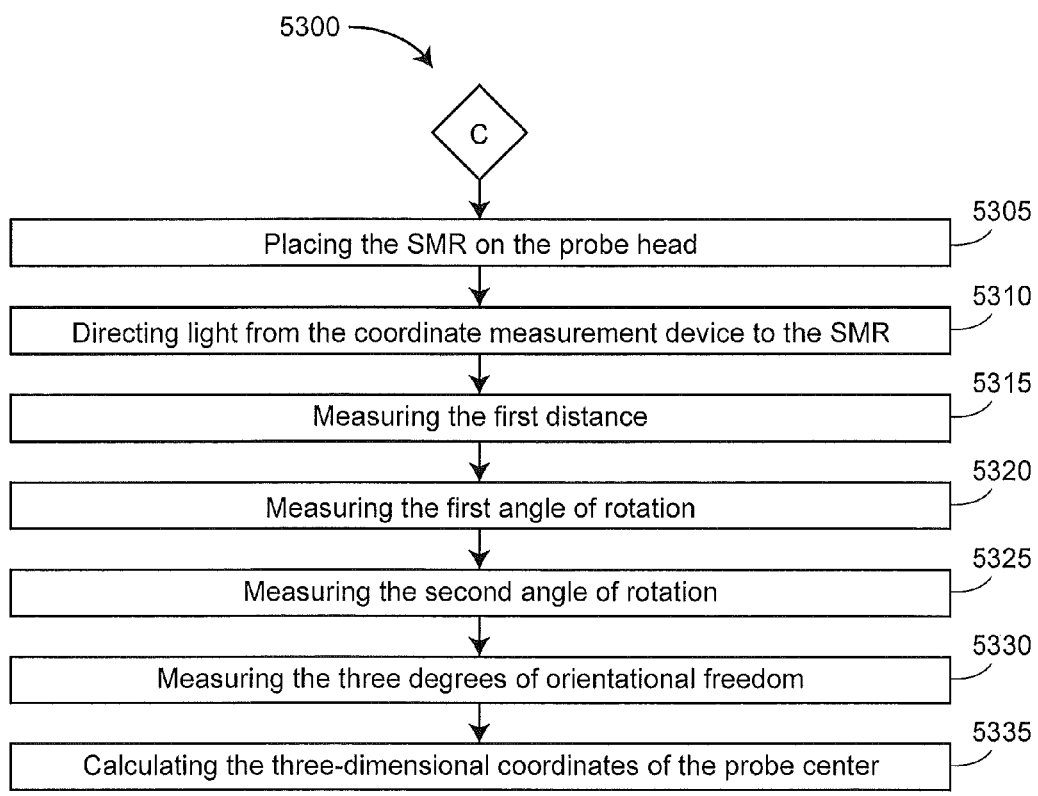
FIG. 22 is a flow chart of a method that begins at reference marker C of FIG. 21, according to an embodiment of the present invention.

FIG. 22 is a flow chart for a method 5300 that begins at reference marker C of FIG. 21. The step 5305 is placing the spherically mounted retroreflector on the probe head. The step 5310 is directing the first beam of light from the coordinate measurement device to the spherically mounted retroreflector. The step 5315 is measuring the first distance. The step 5320 is measuring the first angle of rotation. The step 5325 is measuring the second angle of rotation. The step 5330 is measuring the three degrees of orientational freedom. The step 5335 is calculating the three-dimensional coordinates of the probe center based at least in part on the first distance, the first angle of rotation, the second angle of rotation, and the three orientational degrees of freedom.

Figure 23:
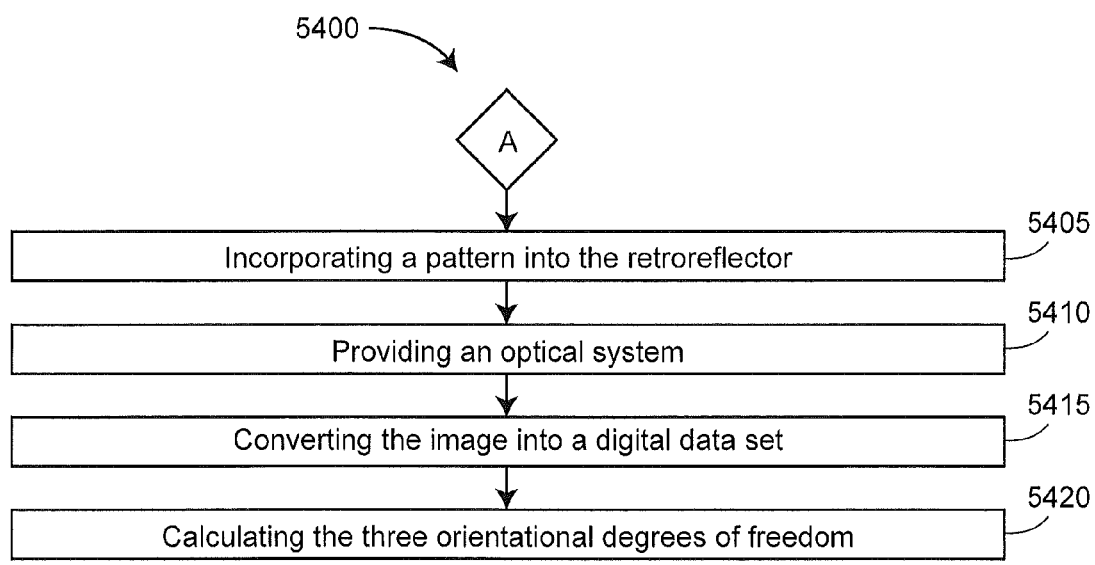
FIG. 23 is a flow chart of a method that begins at reference marker A of FIG. 18, according to an embodiment of the present invention.

FIG. 23 is a flow chart for a method 5400 that begins at reference marker A of FIG. 18. The step 5405 is incorporating a pattern into the retroreflector. The step 5410 is providing an optical system including a lens and a photosensitive array, the lens configured to form an image of at least a portion of the patterned retroreflector on the photosensitive array. The step 5415 is converting the image into a digital data set. The step 5420 is calculating the three orientational degrees of freedom based at least in part on the digital data set.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for measuring three-dimensional coordinates of a first point and a second point, the method comprising:

providing a spherically mounted retroreflector, the spherically mounted retroreflector including a retroreflector mounted in a retroreflector body, the retroreflector body having a first spherical shape over a first portion of its outer surface, the first portion having a target center, the retroreflector configured to receive a first beam of light and to return a second beam of light, the second beam of light being a portion of the first beam of light, the second beam of light traveling in a direction substantially opposite the direction of the first beam of light;

providing a probe assembly, the probe assembly including a probe stylus and a probe head, the probe stylus including a probe tip, the probe tip having a second spherical shape over a second portion of its surface, the second portion having a probe center, the probe head configured to receive the spherically mounted retroreflector and to permit rotation of the spherically mounted retroreflector about the target center while keeping the target center at a substantially constant position relative to the probe assembly;

providing a coordinate measurement device, the coordinate measurement device including a first motor, a second motor, a first angle measuring device, a second angle measuring device, a distance meter, a position detector, a control system, an orientation sensor, and a processor, the first motor and the second motor configured together to direct the first beam of light to a first direction, the first direction determined by a first angle of rotation about a first axis and a second angle of rotation about a second axis, the first angle of rotation produced by the first motor and the second angle of rotation produced by the second motor, the first angle measuring device configured to measure the first angle of rotation and the second angle measuring device configured to measure the second angle of rotation, the distance meter configured to measure a first distance from the coordinate measurement device to the spherically mounted retroreflector based at least in part on a third portion of the second beam of light received by a first optical detector, the position detector configured to produce a first signal in response to a position of a fourth portion of the second beam of light on the position detector, the control system configured to send a second signal to the first motor and a third signal to the second motor, the second signal and the third signal based at least in part on the first signal, the control system configured to adjust the first direction of the first beam of light to the position in space of the spherically mounted retroreflector, the orientation sensor configured to measure three orientational degrees of freedom of the probe assembly, the processor configured to determine three-dimensional coordinates of the probe center, the three-dimensional coordinates based at least in part on the first distance, the first angle of rotation, the second angle of rotation, and the three orientational degrees of freedom;

placing the spherically mounted retroreflector on the probe head;

moving the probe center to the first point;

directing the first beam of light from the coordinate measurement device to the spherically mounted retroreflector;

measuring the first distance;

measuring the first angle of rotation;

measuring the second angle of rotation;

measuring the three orientational degrees of freedom based at least in part on information provided by the orientation sensor;

determining a first set of three-dimensional coordinates of the probe center based at least in part on the first distance, the first angle of rotation, the second angle of rotation, and the three orientational degrees of freedom;

storing the first set of three-dimensional coordinates of the probe center;

removing the spherically mounted retroreflector from the probe head;

moving the target center to the second point after removing the spherically mounted retroreflector from the probe head;

directing the first beam of light from the coordinate measurement device to the spherically mounted retroreflector with the target center in the second point;

measuring a second distance with the target center in the second point;

measuring a third angle of rotation with the target center in the second point;

measuring a fourth angle of rotation with the target center in the second point;

determining a second set of three-dimensional coordinates of the target center based at least in part on the second distance, the third angle of rotation, and the fourth angle of rotation; and storing the second set of three-dimensional coordinates of the target center.

2. The method of claim 1, wherein the step of placing the spherically mounted retroreflector on the probe head further includes placing the spherically mounted retroreflector into an indexed position.

3. The method of claim 2, wherein:
the step of providing a spherically mounted retroreflector further includes providing the spherically mounted retroreflector with a collar, the collar including indexing features;
the step of providing a probe assembly further includes providing the probe head with a mating structure, the mating structure having mating features; and
the step of placing the spherically mounted retroreflector on the probe head further includes moving the spherically mounted retroreflector into the indexed position by registering the indexing features with the mating features.

4. The method of claim 1, wherein the step of placing the spherically mounted retroreflector on the probe head further includes rotating the spherically mounted retroreflector relative to the probe head into a desired orientation without translating the target center.

5. The method of claim 4, wherein:
the step of providing a probe assembly further includes providing the probe head with a clamping device, the clamping device configured to hold the spherically mounted retroreflector in a fixed orientation; and
the step of placing the spherically mounted retroreflector further includes clamping the spherically mounted retroreflector into the desired orientation.

6. The method of claim 4, further includes the step of determining probe compensation parameters, the probe compensation parameters including at least information indicative of an orientation of the spherically mounted retroreflector in relation to the probe assembly.

7. The method of claim 6, wherein the step of determining probe compensation parameters further includes steps of:
providing a nest configured to accept the probe tip, the nest further configured to permit rotation of the probe tip about the probe center, the probe center held at a substantially fixed point in space;
placing the probe tip into the nest;
rotating the probe tip;
measuring a collection of quantities, the collection of quantities including the first distance, the first angle of rotation, the second angle of rotation, and the three orientational degrees of freedom, each of the measured values obtained for a plurality of different rotations of the probe tip; and
calculating the probe compensation parameters based at least in part on the collection of quantities.

8. The method of claim 1, further including steps of:
incorporating a pattern into the retroreflector;
providing an optical system including a lens and a photosensitive array, the lens configured to form an image of at least a portion of the patterned retroreflector on the photosensitive array;
converting the image into a digital data set; and
calculating the three orientational degrees of freedom based at least in part on the digital data set.

9. The method of claim 8, wherein, in the step of providing a spherically mounted retroreflector, the retroreflector is a glass cube-corner retroreflector.

10. The method of claim 1, wherein, in the step of providing the probe assembly, the probe assembly operates without the use of electrical power.

11. The method of claim 1, wherein the probe assembly includes an actuator button.

12. The method of claim 1, wherein in the step of providing the probe assembly the probe stylus is removed and is replaced by a second probe stylus.

13. The method of claim 1 wherein the step of placing the spherically mounted retroreflector on the probe head includes magnetically coupling the spherically mounted retroreflector to the probe head.

\* \* \* \* \*